(12) United States Patent
Choi et al.

(10) Patent No.: US 9,722,270 B2
(45) Date of Patent: Aug. 1, 2017

(54) POLYMER, ELECTROLYTE MEMBRANE AND ELECTRODE FOR A FUEL CELL, EACH INCLUDING THE POLYMER, FUEL CELL INCLUDING AT LEAST ONE OF THE ELECTROLYTE MEMBRANE, AND THE ELECTRODE

(71) Applicants: Samsung Electronics Co., Ltd., Suwon-si, Gyeonggi-do (KR); Seoul National University R&DB Foundation, Seoul (KR)

(72) Inventors: Seong-woo Choi, Yongin-si (KR); Chan-ho Pak, Seoul (KR); Ki-hyun Kim, Seoul (KR); Jong-chan Lee, Seoul (KR)

(73) Assignees: SAMSUNG ELECTRONICS CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 392 days.

(21) Appl. No.: 14/338,432

(22) Filed: Jul. 23, 2014

(65) Prior Publication Data
US 2015/0037708 A1 Feb. 5, 2015

(30) Foreign Application Priority Data
Jul. 30, 2013 (KR) .................. 10-2013-0090426

(51) Int. Cl.
*H01M 8/10* (2016.01)
*H01M 8/1032* (2016.01)
(Continued)

(52) U.S. Cl.
CPC .......... *H01M 8/1032* (2013.01); *C08G 75/23* (2013.01); *H01M 8/1034* (2013.01); *H01M 2008/1095* (2013.01); *H01M 2300/0082* (2013.01)

(58) Field of Classification Search
CPC .................................................. H01M 8/1032
See application file for complete search history.

(56) References Cited

U.S. PATENT DOCUMENTS 7,550,216 B2 * 6/2009 Ofer .................. B01D 67/0088
429/188
2006/0275638 A1 * 12/2006 Cao .................... C08G 65/4056
429/483
(Continued)

FOREIGN PATENT DOCUMENTS

JP 2011-241299 * 12/2011
KR 1020070088203 A 8/2007
(Continued)

OTHER PUBLICATIONS

Sung-Kon Kim et al. "Highly durable polymer electrolyte membranes at elevated temperature: Cross-linked copolymer structure consisting of poly(benzoxazine) and poly(benzimidazole)", Journal of Power Sources 226 (2013) 346-353.
(Continued)

*Primary Examiner* — Jonathan Crepeau
(74) *Attorney, Agent, or Firm* — Cantor Colburn LLP

(57) ABSTRACT

A polymer including a reaction product of a sulfonated polyarylene ether sulfone and at least one compound selected from a sulfonated compound having a thiol group at a terminal thereof and a sulfonated compound having a hydroxy group at a terminal thereof.

15 Claims, 14 Drawing Sheets

(51) Int. Cl.
    *C08G 75/23*     (2006.01)
    *H01M 8/1034*   (2016.01)
    *H01M 8/1018*   (2016.01)

(56) References Cited

U.S. PATENT DOCUMENTS

2011/0195341 A1    8/2011   Katayama
2013/0266890 A1*  10/2013  Lee .................... H01M 8/1039
                                                      429/494

FOREIGN PATENT DOCUMENTS

| KR | 10-0934529 B1 | 12/2009 |
| KR | 1020100058952 A | 6/2010 |
| KR | 10-1004680 B1 | 12/2010 |

OTHER PUBLICATIONS

Sung-Kon Kim et al. "Poly[2,2'-(m-phenylene)-5,5'-bibenzimidazole] and Poly[6-fluoro-3-(pyridin-2-yl)-3,4-dihydro-2H-benzoxazine] Based Polymer Electrolyte Membranes for Fuel Cells at Elevated Temperature", Macromolecular Research, vol. 20, No. 11, pp. 1181-1190 (2012).

* cited by examiner

POLYMER, ELECTROLYTE MEMBRANE AND ELECTRODE FOR A FUEL CELL, EACH INCLUDING THE POLYMER, FUEL CELL INCLUDING AT LEAST ONE OF THE ELECTROLYTE MEMBRANE, AND THE ELECTRODE

CROSS-REFERENCE TO RELATED APPLICATIONS

This application claims priority to Korean Patent Application No. 10-2013-0090426, filed on Jul. 30, 2013, and all the benefits accruing therefrom under 35 U.S.C. §119, the content of which is incorporated herein in its entirety by reference.

BACKGROUND

1. Field

The present disclosure relates to a polymer, an electrolyte membrane for fuel cells including the polymer, an electrode for fuel cells including the polymer, and a fuel cell including at least one of the electrolyte membrane and the electrode.

2. Description of the Related Art

According to types of an electrolyte and fuel used, fuel cells can be classified as polymer electrolyte membrane fuel cells ("PEMFCs"), direct methanol fuel cells ("DMFCs"), phosphoric acid fuel cells ("PAFCs"), molten carbonate fuel cells ("MCFCs"), or solid oxide fuel cells ("SOFCs").

PEMFCs operating at 100° C. or higher temperatures in non-humidified conditions, as compared to those operable at low temperatures, do not need a humidifier, and are known to be convenient in terms of control of water supply and highly reliable in terms of system operation. Furthermore, such high-temperature PEMFCs not requiring any humidifier may be more durable against carbon monoxide (CO) poisoning that may occur in fuel electrodes, and thus, a simplified reformer may be used therefor. Due to these advantages, PEMFCs operable at medium and high temperatures in non-humidified conditions are increasingly drawing attention.

Along with the current trends for increasing the operation temperature of PEMFCs as described above, fuel cells operable at medium and high temperatures are drawing more attention.

However, the electrolyte membranes developed so far do not display satisfactory ion conductivity and durability at medium and high temperatures. Thus, there remains a demand for the electrolyte membranes having improved ionic conductivity and durability.

SUMMARY

Provided are a polymer, and an electrolyte membrane with improved ionic conductivity and improved durability, the electrolyte membrane including the polymer.

Provided is an electrode for fuel cells, the electrode including the polymer.

Provided is a fuel cell including at least one of the electrolyte membrane and the electrode described above.

Additional aspects will be set forth in part in the description which follows and, in part, will be apparent from the description, or may be learned by practice of the presented embodiments.

According to an aspect of the present disclosure, a polymer includes:

a reaction product of a sulfonated polyarylene ether sulfone and
at least one compound selected from
a sulfonated compound having a thiol group at a terminal thereof and
a sulfonated compound having a hydroxy group at a terminal thereof.

According to another aspect of the present disclosure, an electrolyte membrane for a fuel cell includes the above-described polymer.

According to another aspect of the present disclosure, an electrode for a fuel cell includes the above-described polymer.

According to another aspect of the present disclosure, a fuel cell includes a pair of electrodes and an electrolyte membrane disposed between the electrodes, wherein at least one of the electrodes and the electrolyte membrane includes the above-described polymer.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
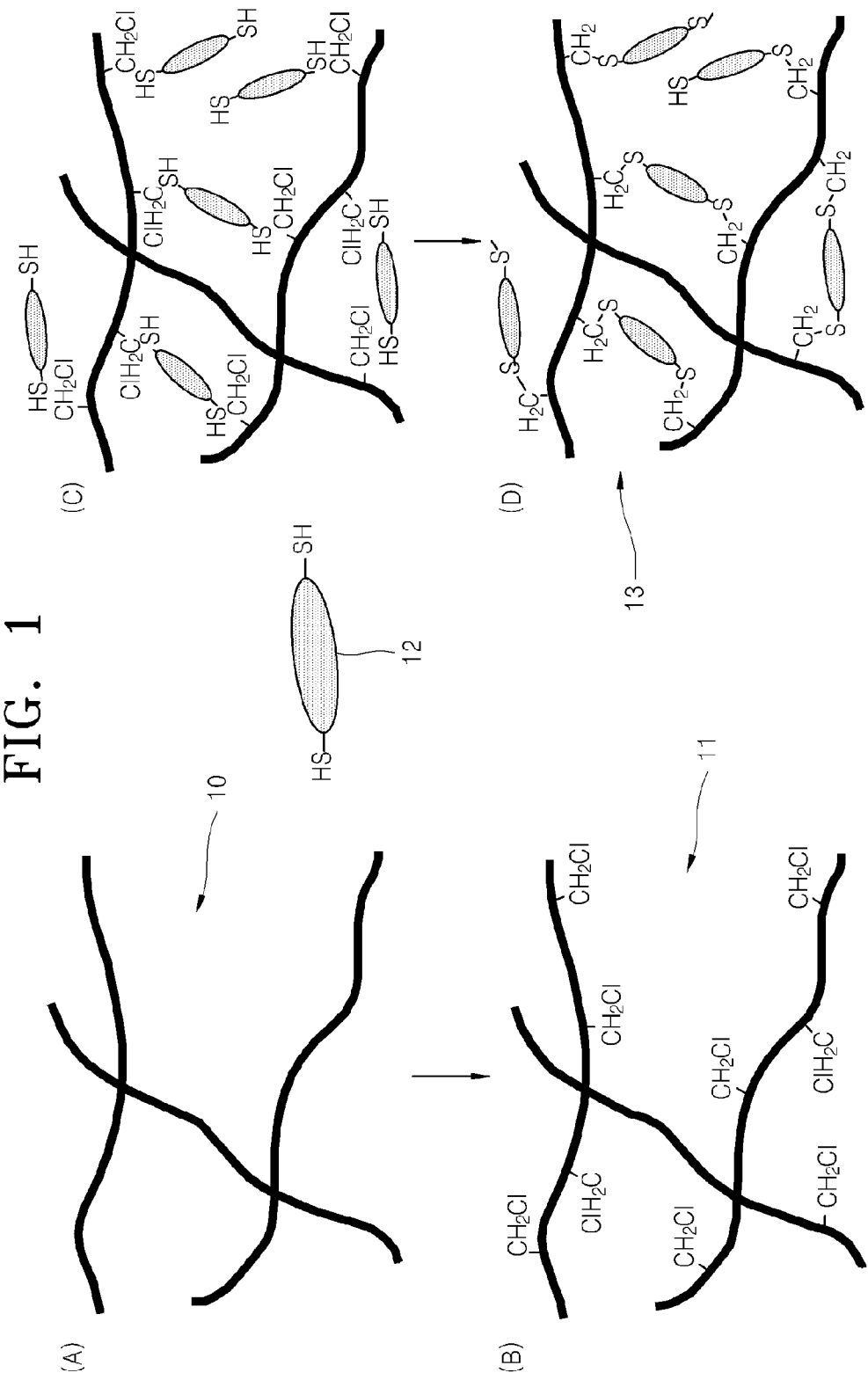
FIG. 1 is a schematic view illustrating a process of preparing a polymer according to an embodiment of the present disclosure.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a polymer, an electrolyte membrane and an electrode for a fuel cell that include the polymer, and a fuel cell including at least one of the electrolyte membrane and the electrode will be described in detail.

According to an embodiment of the present disclosure, there is provided a polymer including:
a reaction product of a sulfonated polyarylene ether sulfone and
at least one compound selected from
a sulfonated compound having a thiol group at a terminal thereof and
a sulfonated compound having a hydroxy group at a terminal thereof.

As used herein, the term "sulfonated polyarylene ether sulfone" refers to polyarylene ether sulfone having a sulfonic acid group.

The reaction product may be a cross-linked reaction product of a sulfonated polyarylene ether sulfone and at least one compound selected from the sulfonated compound having a thiol group at a terminal thereof and the sulfonated compound having a hydroxy group at a terminal thereof.

For example, the sulfonated polyarylene ether sulfone may have a degree of sulfonation of about 30% to about 95%, and in some embodiments, of about 50% to about 70%.

As used herein, the term "degree of sulfonation" refers to the percent of sulfonyl-linked units containing sulfonate groups in the PAES, determined based on the sulfonyl-linked monomers used as a starting material or based on $^1$H-NMR integration calculation.

Polyarylene ether sulfone is a material based on an aromatic hydrocarbon backbone and having a high glass transition temperature, low gas permeability, and high thermal stability, which has drawn attention as a material for electrolyte membrane for next-generation fuel cells. However, polyarylene ether sulfone may have lower proton conductivity in a low humidity condition compared to Nafion and may be water soluble in a high humidity condition. Thus, the polyarylene ether sulfone still needs improved proton conductivity and improved stability in a high humidity condition for commercial use.

To meet these desired properties, the inventors of the present disclosure synthesized a polymer with improved proton conductivity and improved chemical and physical properties in high-temperature, humid conditions by introducing a chloromethyl group (—CH$_2$Cl) into a main chain of sulfonated polyarylene ether sulfone and then performing a condensation polymerization between the chloromethyl group of the sulfonated polyarylene ether sulfone and at least one of a sulfonated compound having a thiol group at a terminal thereof and a sulfonated compound having a hydroxy group at a terminal thereof as a cross-linking agent.

After the condensation polymerization, the main chains of the sulfonated polyarylene ether sulfone are cross-linked by a reaction of the chloromethyl group and the thiol group of the cross-liking agent to form the polymer having a large number of sulfonic acid groups.

The sulfonated compound having a hydroxy group at a terminal thereof is structurally identical to the sulfonated compound having a thiol group at a terminal thereof, except the presence of the hydroxy group, instead of the thiol group, at the terminal thereof.

The presence of the large number of sulfonic acid groups in the polymer may provide improved proton conductivity when the polymer is used as a material for an electrolyte membrane. Such a polymer is characterized by the increased concentration of protons per unit area, and the cross-linked structure of the polymer may suppress expansion of the electrolyte membrane even with absorption of moisture, so that the electrolyte membrane may have improved chemical and physical stabilities.

FIG. 1 is a schematic view illustrating a process of preparing a polymer according to an embodiment of the present disclosure, in which the polymer is prepared using a sulfonated compound having a thiol group at a terminal thereof as a cross-linking agent, in the order of (A), (B), (C), and (D).

Referring to FIG. 1, chloromethylated sulfonated polyarylene ether sulfone 11 may be obtained from sulfonated polyarylene ether sulfone 10 by chloromethylation.

The chloromethylated sulfonated polyarylene ether sulfone 11 may then be reacted with a sulfonated compound 12 having a thiol group at a terminal thereof for condensation polymerization to form a polymer 13.

The sulfonated compound 12 having a thiol group at a terminal thereof has a sulfonic acid group in a molecular structure thereof, in which an unshared electron pair of oxygen in the sulfonic acid group may facilitate intermolecular bonding, and an appropriate number of sulfonic acid groups may prevent decreased conductivity of a reaction product resulting from a cross-linking reaction of the sulfonated polyarylene ether sulfone and the sulfonated compound 12 having a thiol group at a terminal thereof.

The sulfonated compound having a thiol group at a terminal thereof may have a degree of sulfonation of, for example, about 1% to about 100%, and in some embodiments, about 10% to about 100%. For example, the sulfonated compound having a thiol group at a terminal thereof may be a compound represented by Formula 1 below:

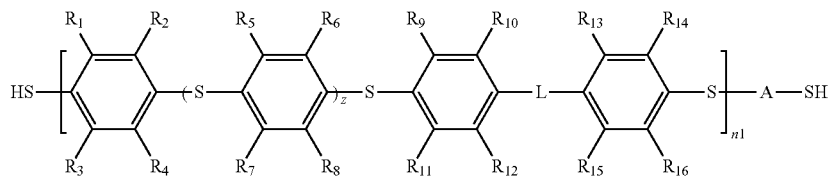

Formula 1

In Formula 1 above, $R_1$ to $R_{16}$ may be each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, wherein at least one of $R_9$ to $R_{12}$ may be —SO$_3$M group, and at least one of $R_{13}$ to $R_{16}$ may be —SO$_3$M group, where M may be a hydrogen (H), sodium (Na), or potassium (K), z may be 0 or 1, L may be —S(=O)$_2$—, or —P(=O)Y—, where Y is a C6-C40 aryl group substituted with an —SO$_3$M group where M is hydrogen, sodium, or potassium, n1 may be a number from 1 to 5,000, and A is a group repeating unit of Formula 2 below.

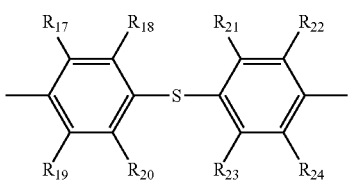

Formula 2

In Formula 2 above, $R_{17}$ to $R_{24}$ may be each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group.

In Formula 1 above, when L is —S(=O)$_2$— or —P(=O)Y—, one of $R_9$ and $R_{11}$ may be a —SO$_3$M group, one of $R_{14}$ and $R_{16}$ may be a —SO$_3$M group, and $R_{10}$, $R_{12}$, $R_{13}$, and $R_{15}$ may be all hydrogen atoms.

The sulfonated compound having a thiol group at a terminal thereof may be at least one of a compound represented by Formula 3 below and a compound represented by Formula 4 below.

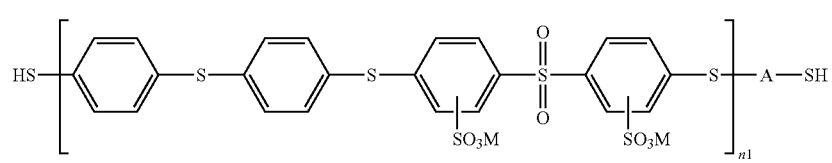

Formula 3

In Formula 3 above,
M may be a hydrogen (H), sodium (Na), or potassium (K),
n1 may be a number from 1 to 5,000, and
A may be a group represented by Formula 2A below.

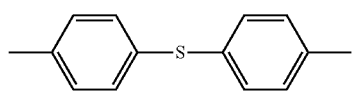

Formula 2A

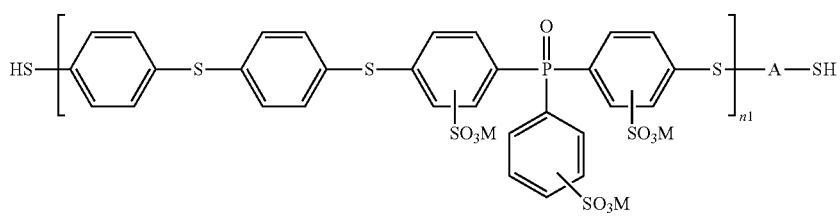

Formula 4

In Formula 4,
M may be a hydrogen (H), sodium (Na), or potassium (K),
n1 may be a number from 1 to 5,000, and
A may be a group represented by Formula 2A above.

For example, the compound represented by Formula 4 above may be a compound represented by Formula 17 below.

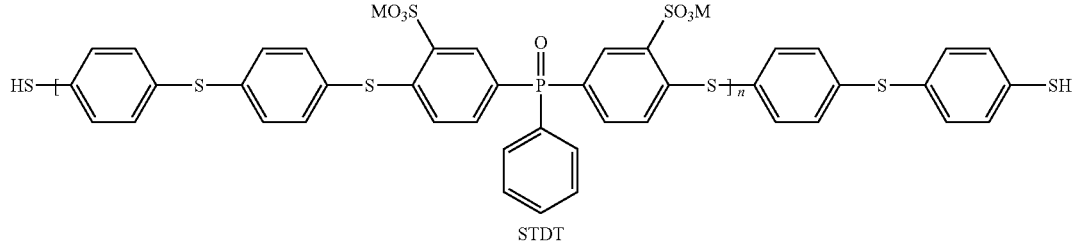

Formula 17

STDT

In some embodiments, the polyarylene ether sulfone used in the polymer may include a first repeating unit represented by Formula 5 below and a second repeating unit represented by Formula 6 below. The first repeating unit of Formula 5 below may be from about 0.01 mole % to about 0.99 mole %, for example, from about 0.1 mole % to about 0.9 mole %, and the second repeating unit of Formula 6 below may be from about 0.01 mole % to about 0.99 mole %, for example, from about 0.1 mole % to about 0.9 mole %.

Formula 5

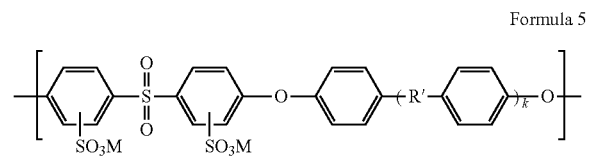

In Formula 5 above,

R' may be a single bond, —O—, —S(=O)$_2$—, —C(=O)—, or —C(CH$_3$)$_2$—,

M may be a hydrogen (H), sodium (Na), or potassium (K), and k may be 0 or 1.

Formula 6

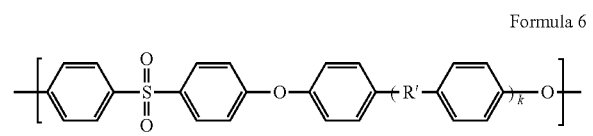

In Formula 6 above,

R' may be a single bond, —O—, —S(=O)$_2$—, —C(=O)—, or —C(CH$_3$)$_2$—, and k may be 0 or 1.

For example, the first repeating unit of Formula 5 above may be a repeating unit represented by Formula 7 below.

Formula 7

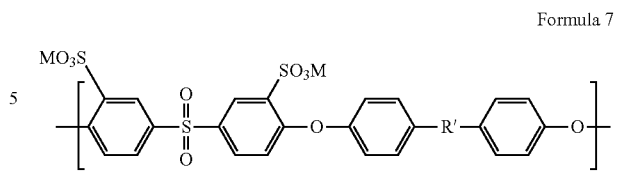

In Formula 7 above,

A. R' may be a single bond, —O—, —S(=O)$_2$—, —C(=O)—, or —C(CH$_3$)$_2$—, and

M may be a hydrogen (H), sodium (Na), or potassium (K).

In some other embodiments, the polymer may include a repeating unit represented by Formula 8 below and a repeating unit represented by Formula 9 below, wherein an amount of the repeating unit represented by Formula 8 below may be from about 0.01 mole % to about 0.99 mole %, for example, from about 0.1 mole % to about 0.9 mole %, and an amount of the repeating unit represented by Formula 9 below may be from about 0.01 mole % to about 0.99 mole %, for example, from about 0.1 mole % to about 0.9 mole %.

Formula 8

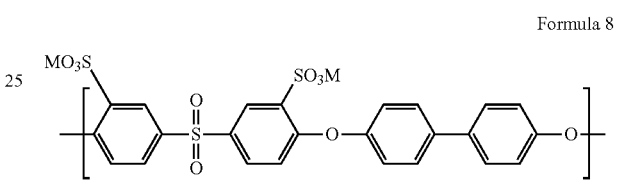

In Formula 8, M is hydrogen, sodium, or potassium.

Formula 9

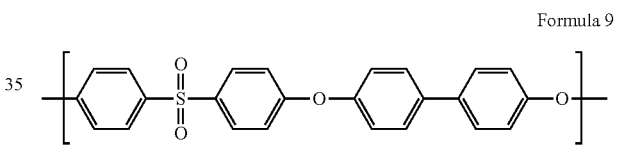

At least one of the sulfonated compound having a thiol group at a terminal thereof and the sulfonated compound having a hydroxy group at a terminal thereof may be at least one compound selected from a compound represented by Formula 10 below and a compound represented by Formula 11 below.

Formula 10

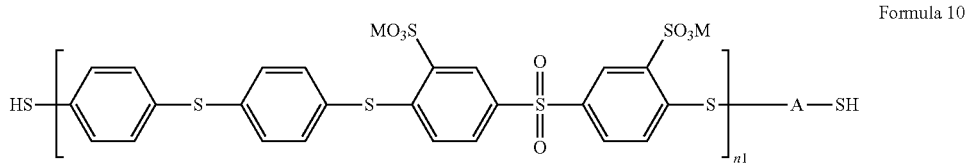

In Formula 10 above,

M may be a hydrogen (H), sodium (Na), or potassium (K), n1 may be a number from 1 to 500, for example, a number from 5 to 500, and A may be a group represented by Formula 2A below.

Formula 2A

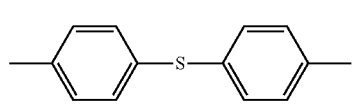

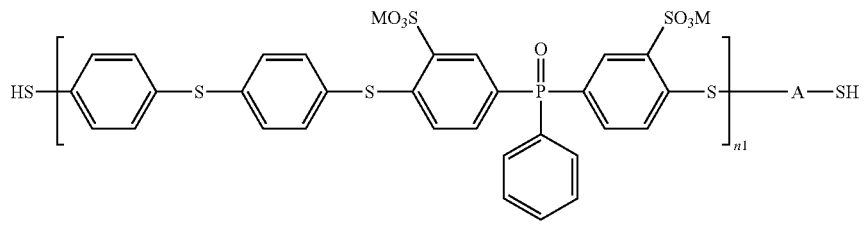

Formula 11

In Formula 11 above,

M may be a hydrogen (H), sodium (Na), or potassium (K), n1 may be a number from 1 to 5,000, and A may be a group represented by Formula 2A above.

In some embodiments, an amount of the at least one compound selected from the sulfonated compound having a thiol group at a terminal thereof and the sulfonated compound having a hydroxy group at a terminal thereof may be from about 1 part to about 99 parts, for example, from about 10 parts to about 99 parts by weight based on 100 parts by weight of the sulfonated polyarylene ether sulfone. When the amount of the at least one compound selected from the sulfonated compound having a thiol group at a terminal thereof and the sulfonated compound having a hydroxy group at a terminal thereof is within this range, the polymer may have improved proton conductivity and improved stability.

For example, the polyarylene ether sulfone of the polymer may have a degree of sulfonation of about 30% to about 95%, and in some embodiments, of about 50% to about 70%. When using the polyarylene ether sulfone having a degree of sulfonation within these ranges, an electrolyte membrane with improved proton conductivity without deterioration in mechanical characteristics may be obtained from the polymer.

In some embodiments, the polymer may be a reaction product of a polyarylene ether sulfone represented by Formula 12 below or a polyarylene ether sulfone represented by Formula 13 below, and a compound represented by Formula 14 below.

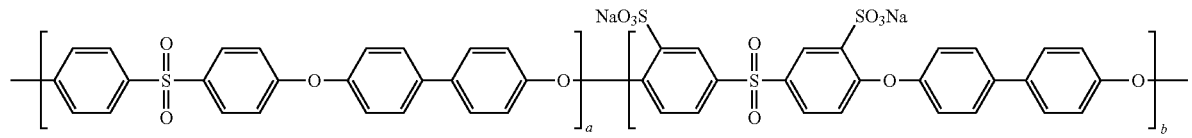

Formula 12

In Formula 12 above, a and b, which indicate mole fractions, may be each from about 0.01 to about 0.99, where a+b=1.

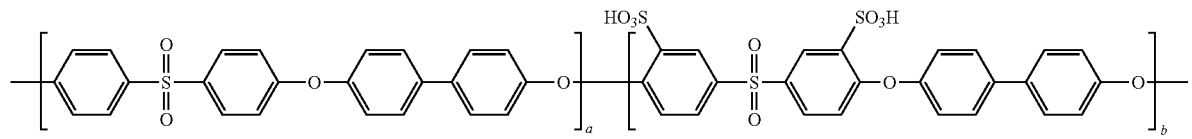

Formula 13

In Formula 13 above, a and b, which indicate mole fractions, may be each from 0.01 to 0.99, where a+b=1.

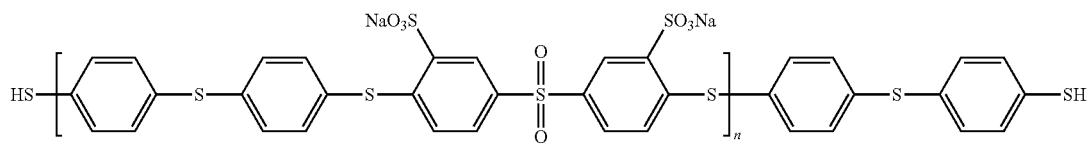

Formula 14

In Formula 14 above, n may be a number from 1 to 5,000.

In some other embodiments, the polymer may be a reaction product of a polyarylene ether sulfone represented by Formula 12 below or a polyarylene ether sulfone represented by Formula 13 below, and a compound represented by Formula 15 below. The polyarylene ether sulfone of Formula 12 below and the polyarylene ether sulfone of Formula 13 may each have a degree of polymerization from 1 to 5,000.

degree of sulfonation and improved mechanical characteristics.

In some embodiments, the sulfonated polyarylene ether sulfone of the polymer may have a degree of polymerization of about 1 to about 5,000 and a weight average molecular weight of about 10,000 Dalton ("Da") to about 1,000,000 Da. When the sulfonated polyarylene ether sulfone has a degree of polymerization and a weight average molecular weight within these ranges, the polymer may have improved Formula 12

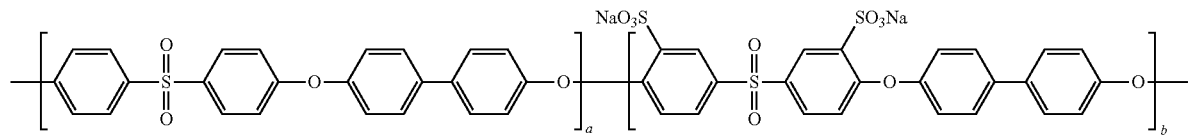

In Formula 12 above, a and b, which indicate mole fractions, may be each from about 0.01 to about 0.99, where a+b=1.

proton conductivity and improved mechanical characteristics. When using such a polymer, an electrolyte membrane with improved proton conductivity, improved stability and Formula 13

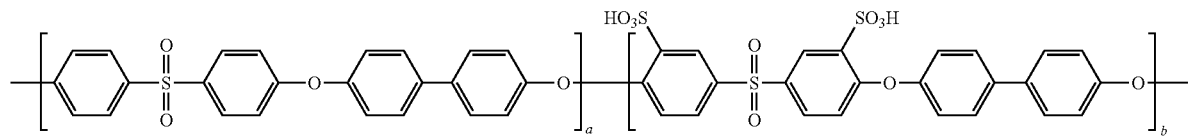

In Formula 13 above, a and b, which indicate mole fractions, may be each from about 0.01 to about 0.99, where a+b=1.

improved durability may be obtained in high-temperature, wide-range of relative humidifies conditions, for example, even at a low humidity.

Formula 15

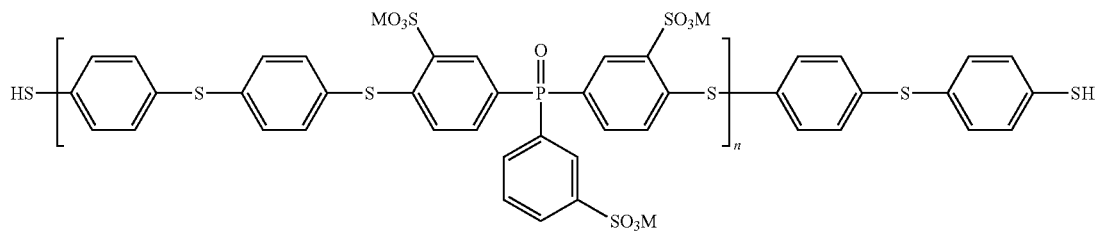

In Formula 15 above, n may be a number of 1 to 5,000, for example, a number of 5 to 500.

In some embodiments, the at least one compound selected from the sulfonated compound having a thiol group at a terminal thereof and the sulfonated compound having a hydroxy group at a terminal thereof may have a degree of polymerization of about 1 to about 5,000, for example, about 5 to about 500. When the at least one compound selected from the sulfonated compound having a thiol group at a terminal thereof and the sulfonated compound having a hydroxy group at a terminal thereof has a degree of polymerization within these ranges, a degree of cross-linking may be appropriately controlled to obtain a polymer with a high Hereinafter, methods of preparing a polymer described in the above embodiments, and an electrolyte membrane including the polymer, according to embodiments of the present disclosure will be described.

As stated above, a chloromethylated sulfonated polyarylene ether may be obtained from a sulfonated polyarylene ether via chloromethylation.

A chloromethylation rate of the chloromethylated sulfonated polyarylene ether may be from about 1% to about 20%, for example, from about 10% to about 12%. When the chloromethylation rate of the chloromethylated sulfonated polyarylene ether is within these ranges, a degree of cross-linking of the sulfonated polyarylene ether may be appropriately controlled to obtain a polymer with improved proton conductivity and improved physical and chemical stabilities.

The chloromethylation reaction may be performed via a widely known method in the art. The chloromethylation reaction may be a reaction between, for example, tin chloride and chloromethyl methyl ether ($CH_3OCH_2Cl$).

At least one compound selected from a sulfonated compound having a thiol group at a terminal thereof and a sulfonated compound having a hydroxyl group at a terminal thereof may be added to the chloromethylated sulfonated polyarylene ether and then reacted with the same by a condensation polymerization reaction to obtain a reaction product, i.e., a cross-linked reaction product of the chloromethylated sulfonated polyarylene ether and the at least one of the sulfonated compound having a thiol group at a terminal thereof and the sulfonated compound having a hydroxyl group at a terminal thereof.

The condensation polymerization reaction may be performed at a temperature of, for example, about 20° C. to about 2000, for example, about 50° C. to about 200° C. When the temperature of the condensation polymerization reaction is within this range, a polymer with improved proton conductivity and improved chemical and mechanical characteristics may be obtained. The condensation polymerization reaction may be performed in manufacturing an electrolyte membrane. For example, a composition including the chloromethylated sulfonated polyarylene ether and at least one compound selected from the sulfonated compound having a thiol group at a terminal thereof and the sulfonated compound having a hydroxyl group at a terminal thereof may be coated on a substrate and then thermally treated to obtain the reaction product, i.e., a cross-linked reaction product between the chloromethylated sulfonated polyarylene ether and the at least one of the sulfonated compound having a thiol group at a terminal thereof and the sulfonated compound having a hydroxyl group at a terminal thereof.

The reaction product between the chloromethylated sulfonated polyarylene ether and the at least one of the sulfonated compound having a thiol group at a terminal thereof and the sulfonated compound having a hydroxyl group at a terminal thereof may have improved proton conductivity due to the presence of an appropriate amount of sulfonic acid groups and have improved stability and improved durability due to the cross-linked structure.

For example, the sulfonated polyarylene ether sulfone may have a degree of sulfonation of about 30% to about 95%, in some embodiments, about 30% to 95%, and in some other embodiments, about 50% to about 70%. When the sulfonated polyarylene ether sulfone has a degree of sulfonation within these ranges, the sulfonated polyarylene ether sulfone may be able to effectively form an electrolyte membrane with improved chemical and mechanical characteristics without deterioration in film formation caused from the solubility of the sulfonated polyarylene ether sulfone in water.

The sulfonated polyarylene ether sulfone may be prepared in a widely known method in the art.

The at least one of the sulfonated compound having a thiol group at a terminal thereof and the sulfonated compound having a hydroxy group at a terminal thereof may have a degree of sulfonation of about 50% to about 70%, for example, about 60%. When the at least one of the sulfonated compound having a thiol group at a terminal thereof and the sulfonated compound having a hydroxy group at a terminal thereof have a degree of sulfonation within this range, the polymer may have improved durability and improved solubility in organic solvent.

The sulfonated compound having a thiol group at a terminal thereof may be obtained via continuous dehydration and polymerization condensation of a compound represented by Formula 18 below having a thiol group at a terminal thereof and a compound represented by Formula 19 below.

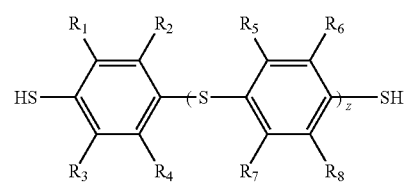

Formula 18

In Formula 18 above, $R_1$ to $R_6$ may be each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, M may be a hydrogen (H), sodium (Na), or potassium (K); and z may be 0 or 1.

Formula 19

In Formula 19 above, $R_9$ to $R_{16}$ may be each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, wherein at least one of $R_9$ to $R_{12}$ may be —$SO_3M$ group, and at least one of $R_{13}$ to $R_{16}$ may be —$SO_3M$ group;

M may be a hydrogen (H), sodium (Na), or potassium (K);

z may be 0 or 1, L is —S(=O)$_2$—, or —P(=O)Y—;

Y may be a C6-C40 aryl group with —$SO_3M$ group; and

X may be a halogen atom, for example, chlorine (Cl), bromine (Br), or iodine (I).

The dehydration and polymerization condensation reactions may be performed at a temperature of about 80° C. to about 200° C. in the presence of a base. For example, the base may be sodium carbonate, potassium carbonate, rubidium carbonate, or cesium carbonate. An amount of the base may be from about 1 mole to about 1.2 mole based on 1 mole of the compound of Formula 18 above.

The dehydration and polymerization condensation reactions may be performed in a solvent such as sulfolane, dimethylsulfoxide, N,N-dimethylformamide or N-methylpyrrolidone.

An amount of the compound of Formula 19 above may be from about 1 mole to about 1.2 moles, for example, 1.1 mole based on 1 mole of the compound of Formula 18 above.

For example, the compound of Formula 18 above may be a compound represented by Formula 20 below or a compound represented by Formula 21 below.

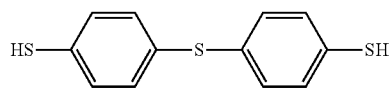

Formula 20

Formula 21

Non-limiting examples of the compound of Formula 19 above are compounds represented by Formulae 22 to 25 below.

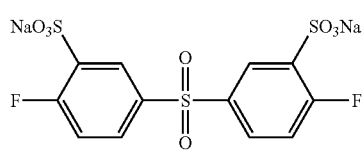

Formula 22

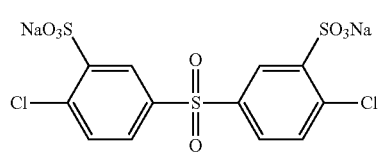

Formula 23

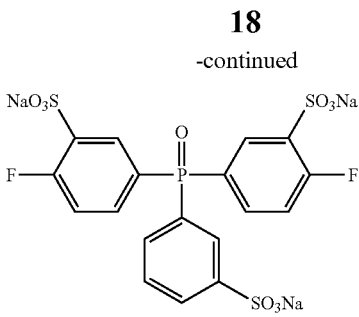

Formula 24

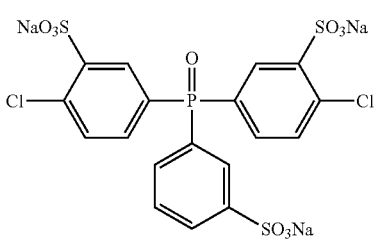

Formula 25

In some other embodiments, as an example of the at least one of the sulfonated compound having a thiol group at a terminal thereof and the sulfonated compound having a hydroxyl group at a terminal thereof, a compound represented by Formula 16 below may be used to prepare the polymer.

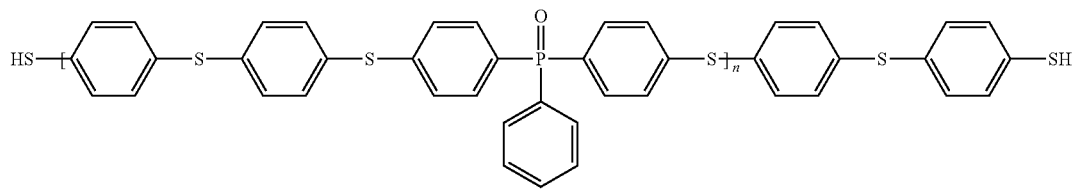

Formula 16

TPDT

In Formula 16 above, n may be a number of about 1 to about 5,000.

The compound of Formula 16 above may be obtained via consecutive dehydration and polymerization condensation reactions of a compound represented by Formula 20 above and a compound represented by Formula 26 or Formula 27 below.

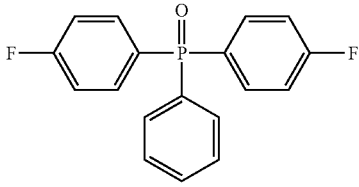

Formula 26

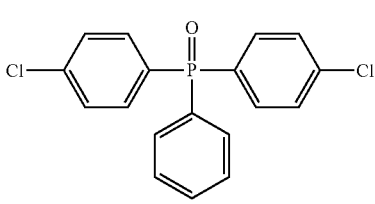

Formula 27

In some embodiments, the polymers according to the above-described embodiments may be used as a material for an electrolyte membrane or electrode of a fuel cell.

According to another embodiment of the present disclosure, an electrode for a fuel cell includes any of the polymers according to the above-described embodiments as an example of a reaction product of the sulfonated polyarylene ether sulfone; and at least one compound selected from the sulfonated compound having a thiol group at a terminal thereof and the sulfonated compound having a hydroxy group at a terminal thereof.

In some embodiments, the electrode may include a mixture of the sulfonated polyarylene ether sulfone, and at least one compound selected from the sulfonated compound having a thiol group at a terminal thereof and the sulfonated compound having a hydroxy group at a terminal thereof.

According to another embodiment of the present disclosure, an electrolyte membrane for a fuel cell include any of the polymers according to the above-described embodiments, wherein, as described above, a composition including chloromethylated sulfonated polyarylene ether and at least one compound selected from the sulfonated compound having a thiol group at a terminal thereof and the sulfonated compound having a hydroxyl group at a terminal thereof may be coated on a substrate and then thermally treated to form a film, which may then be separated from the substrate, thereby manufacturing the electrolyte membrane.

The thermal treatment may be performed at a temperature of about 20° C. to about 200□, for example, about 50° C. to about 200° C.

The substrate is not specifically limited. For example, the substrate may be any of a variety of supports, such as a glass substrate, or a release film, which may be selected depending on the membrane manufacturing process.

Non-limiting examples of the release film are a polytetrafluoroethylene film, a polyvinylidenefluoride film, a polyethyleneterepthalate film, and a mylar film.

The electrolyte membrane may undergo protonization. The protonization as used herein may be, for example, dipping the electrolyte membrane in a sulfuric acid at a temperature of about 60° C. to about 85□, for example, about 70° C., for about 4 hours to about 10 hours. Through the protonization —$SO_3M$ group (where M is Na or K) in the polymer of the electrolyte membrane may be changed into —$SO_3H$ group.

A concentration of the sulfuric acid may be from about 80% to about 98% by weight, for example about 90% to about 98% by weight.

The electrolyte membrane may be provided with a phosphoric acid-based material. The phosphoric acid-based material may be supplied to the electrolyte membrane at a reaction temperature of about 30° C. to about 120° C., for example, at about 60° C.

The phosphoric acid-based material may be supplied to the electrolyte membrane in any of a variety of manners. For example, the electrolyte membrane may be immersed in the phosphoric acid-based material.

The electrolyte membrane prepared through the above-described processes may have a thickness of about 1 micrometer ("μm") to about 100 μm, and in some embodiments, a thickness of about 30 μm to about 90 μm. The electrolyte membrane may be formed as a thin film having a thickness as defined above.

The electrolyte membrane described above is suitable for use in a high-temperature, low-humidity fuel cell. As used herein, the term "high temperature" refers to a temperature of about 120° C. to about 400° C., and the term "low humidity" refers to a relative humidity of about 50% or less; however, the definitions of these terms are not particularly limited. A high-temperature, low-humidity fuel cell is appropriate for use in a vehicle.

According to another embodiment of the present disclosure, a fuel cell include any of the electrolyte membranes according to the above-described embodiments disposed between a cathode and an anode, the fuel cell having improved proton conductivity, improved durability, and improved efficiency characteristics in high-temperature, low-humidity conditions.

Uses of the fuel cell may not be specifically limited. For example, the fuel cell may be used as a solid oxide fuel cell ("SOFC"), a proton exchange membrane fuel cell ("PEMFC"), or the like.

Figure 2:
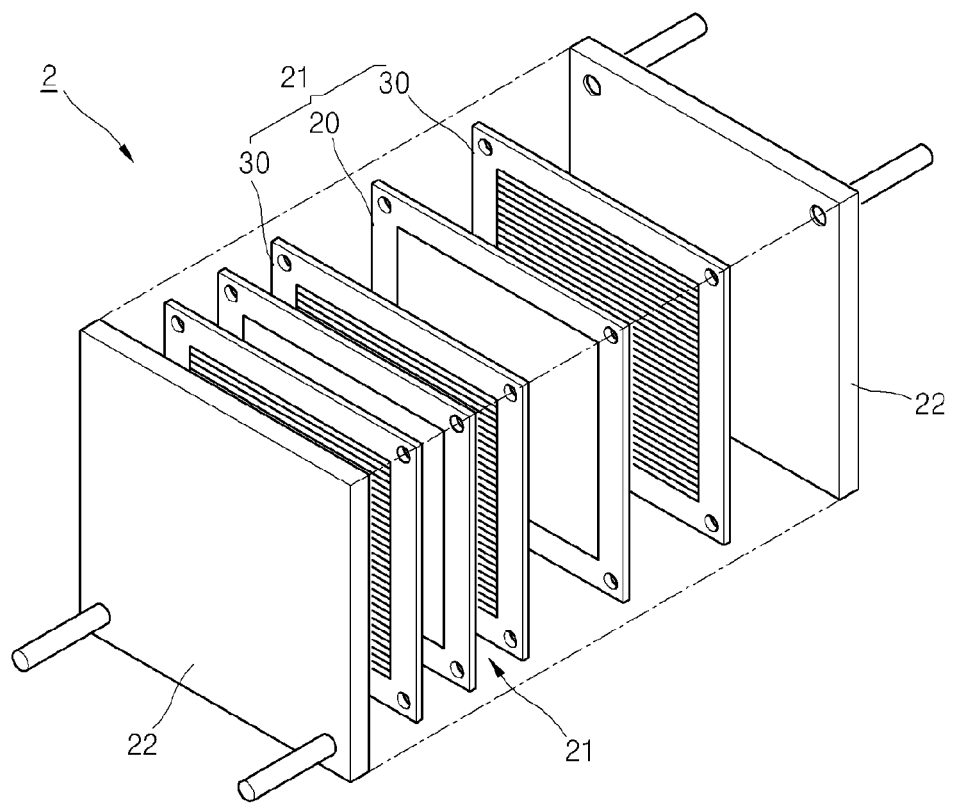
FIG. 2 is an exploded perspective view of a fuel cell according to an embodiment of the present disclosure.
Figure 3:
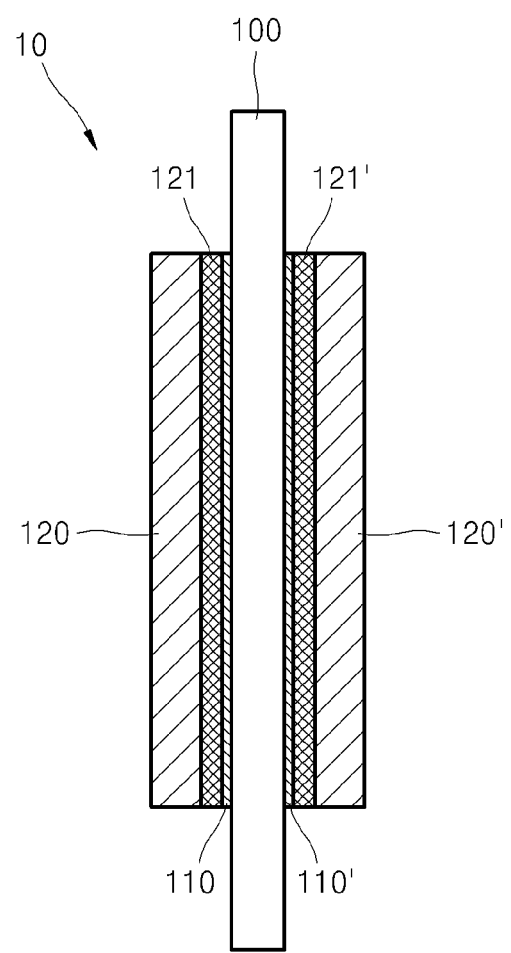
FIG. 3 is a cross-sectional diagram of a membrane-electrode assembly ("MEA") of the fuel cell of FIG. 2.

FIG. 2 is an exploded perspective view of a fuel cell 2 according to an embodiment of the present disclosure. FIG. 3 is a cross-sectional diagram of a membrane-electrode assembly ("MEA") of the fuel cell 2 of FIG. 2.

Referring to FIG. 2, the fuel cell 2 includes two unit cells 21 supported by a pair of holders 22. Each unit cell 21 includes an MEA 20, and bipolar plates 30 disposed on lateral sides of the MEA 20. Each bipolar plate 30 includes a conductive metal, carbon or the like, and is bound to the MEA 20. The bipolar plate 30 may serve as a current collector, and may also supply oxygen and fuel to catalyst layers of the MEA 20.

Although only two unit cells 21 are illustrated in FIG. 2, the number of unit cells is not limited to two. The fuel cell 2 may include several tens or hundreds of unit cells, depending on the properties required for the fuel cell 2.

Referring to FIG. 3, the MEA 20 may include an electrolyte membrane 100, catalyst layers 110 and 110' disposed on lateral sides of the electrolyte membrane 100, and first gas diffusion layers 121 and 121' respectively stacked on the catalyst layers 110 and 110', and second gas diffusion layers 120 and 120' respectively stacked on the first gas diffusion layers 121 and 121'.

The electrolyte membrane 100 may be any of the electrolyte membranes according to the above-described embodiments of the present disclosure.

The catalyst layers 110 and 110' may operate as a fuel electrode and an oxygen electrode, respectively, each including a catalyst and a binder therein. The catalyst layers 110 and 110' may further include a material able to increase an electrochemical surface area of the catalyst.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 and 120' may diffuse oxygen and fuel supplied through the bipolar plates 20 into the entire surfaces of the catalyst layers 110 and 110'.

The fuel cell 2 including the MEA 20 may operate at a temperature of, for example, about 120° C. to about 400° C., for example, about 200° C. to about 400° C. Fuel such as hydrogen may be supplied through one of the bipolar plates 30 into a first catalyst layer, and an oxidant such as oxygen may be supplied through the other bipolar plate 30 into a second catalyst layer. Then, the hydrogen may be oxidized into protons in the first catalyst layer, and the protons may conduct into the second catalyst layer through the electrolyte membrane 24, so that the protons may electrochemically react with oxygen in the second catalyst layer, thereby producing water and electrical energy. The hydrogen supplied as fuel may be hydrogen produced by reformation of hydrocarbons or alcohols. The oxygen used as the oxidant may be supplied in the form of air.

Hereinafter, a method of manufacturing a fuel cell using any of the electrolyte membranes according to the above-described embodiments will be described.

Electrodes for the fuel cell may include a catalyst layer containing a catalyst and a binder.

The catalyst layer may include any of the polymers according to the above-described embodiments of the present disclosure.

The catalyst may be platinum (Pt), an alloy or a mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one metal selected from the group consisting of Pt, a PtCo alloy, and a PtRu alloy. These metals may be supported on a carbonaceous support.

The binder may be at least one of poly(vinylidenefluoride), polytetrafluoroethylene, a tetrafluoroethylene-hexafluoroethylene copolymer, and perfluoroethylene. The amount of the binder may be in the range of about 0.001 to about 0.5 parts by weight, for example, about 0.01 to about 0.5 parts by weight based on 1 part by weight of the catalyst. When the amount of the binder is within this range, the electrode catalyst layer may have strong binding ability to the support.

Any of the electrolyte membranes according to the embodiments of the present disclosure, including a polymer according to one of the above-described embodiments of the present disclosure, may be disposed between the two electrodes, thereby manufacturing the fuel cell.

According to an embodiment of the present disclosure, a method of manufacturing an electrode may involve dispersing a catalyst in a third solvent to obtain a dispersion. The third solvent may be dimethylsulfoxide ("DMSO"), N-methylpyrrolidone ("NMP"), N,N-dimethylformamide ("DMF"), N,N-dimethylacetamide ("DMAC"), or the like. An amount of the third solvent may be from about 100 parts to about 2,000 parts by weight, for example, about 500 parts to about 2,000 parts by weight based on 100 parts by weight of the catalyst.

The sulfonated polyarylene ether sulfone and at least one compound selected from the sulfonated compound having a thiol group at a terminal thereof and the sulfonated compound having a hydroxy group at a terminal thereof, or a polymer including a reaction product of the sulfonated polyarylene ether sulfone and at least one compound selected from the sulfonated compound having a thiol group at a terminal thereof and the sulfonated compound having a hydroxy group at a terminal thereof may be added to the dispersion, and then stirred to obtain a composition for forming the catalyst layer. A binder may be further added to the dispersion.

The composition for the catalyst layer may be coated on the surface of a carbon support, thereby completing formation of the electrode. The carbon support may be fixed on a glass substrate to facilitate the coating. The coating method is not particularly limited, but examples of the coating method may are coating using a doctor blade, bar coating, and screen printing.

The coating of the composition for forming the catalyst layer may be followed by thermal treatment, which may be performed at a temperature of from about 20° C. to about 150° C.

The electrode as a final product may include a polymer according to one of the above-described embodiments of the present disclosure. In some embodiments, the electrode may include the sulfonated polyarylene ether sulfone and at least one compound selected from the sulfonated compound having a thiol group at a terminal thereof and the sulfonated compound having a hydroxy group at a terminal thereof.

Substituents in the formulae above may be defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group an amino group, an amidino group, a hydrazine group, a hydrazone group, a carboxyl group or a salt thereof, a sulfonyl group, a sulfamoyl group, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

As used herein, the term "cycloalkyl" indicates a monovalent group having one or more saturated rings in which all ring members are carbon (e.g., cyclopentyl and cyclohexyl).

As used herein, the term "halogen atom" indicates fluorine, bromine, chloride, iodine, and the like.

As used herein, the term "C1-C20 alkyl group substituted with a halogen atom" indicates a C1-C20 alkyl group substituted with at least one halo group. Non-limiting examples of the C1-C20 alkyl group substituted with a halogen atom include polyhaloalkyls including monohaloalkyl, dihaloalkyl, or perhaloalkyl.

Monohaloalkyls indicate alkyl groups including one iodine, bromine, chloride or fluoride. Dihaloalkyls and polyhaloalkyls indicate alkyl groups including at least two identical or different halo atoms.

As used herein, the term "halogenated" indicates a structural moiety substituted with one or more halogen atoms.

As used herein, the term "alkoxy" represents "alkyl-O—", wherein the term "alkyl" has the same meaning as described above. Non-limiting examples of the alkoxy group are methoxy, ethoxy, propoxy, 2-propoxy, n-butoxy, sec-butoxy, t-butoxy, pentyloxy, hexyloxy, cyclopropoxy, and cyclohexyloxy. At least one hydrogen atom of the alkoxy group may be substituted with substituents that are the same as those recited above in conjunction with the alkyl group.

As used herein, the term "alkoxyalkyl" indicates an alkyl group with a substituent that is the same as that recited above in conjunction with the alkoxy group. At least one hydrogen atom of the alkoxyalkyl group may be substituted with substituents that are the same as those recited above in conjunction with the alkyl group. As defined above, the term "alkoxyalkyl" refers to substituted alkoxyalkyl moieties.

As used herein, the term "alkenyl" indicates a branched or unbranched hydrocarbon with at least one carbon-carbon double bond. Non-limiting examples of the alkenyl group include vinyl, aryl, n-butenyl, iso-propenyl, and iso-butenyl. At least one hydrogen atom in the alkenyl group may be substituted with a substituent that is the same as that recited above in conjunction with the alkyl group.

As used herein, the term "alkynyl" indicated a branched or unbranched hydrocarbon with at least one carbon-carbon triple bond. Non-limiting examples of the "alkynyl" group include ethynyl, n-butynyl, iso-butynyl, and iso-propynyl.

At least one hydrogen atom of the "alkynyl" group may be substituted with substituents that are the same as those recited above in conjunction with the alkyl group.

As used herein, the term "aryl" group, which is used alone or in combination, indicates an aromatic hydrocarbon containing at least one ring.

The term "aryl" is construed as including a group with an aromatic ring fused to at least one cycloalkyl ring.

Non-limiting examples of the "aryl" group are phenyl, naphthyl, and tetrahydronaphthyl.

At least one hydrogen atom of the "aryl" group may be substituted with substituents that are the same as those recited above in conjunction with the alkyl group.

As used herein, the term "arylalkyl" indicates an alkyl group substituted with an aryl group. Examples of the "arylalkyl" group are benzyl, phenyl-$CH_2CH_2$—, and the like.

As used herein, the term "aryloxy" indicates "—O-aryl". An example of the aryloxy group is phenoxy. At least one hydrogen atom of the "aryloxy" group may be substituted with substituents that are the same as those recited above in conjunction with the alkyl group.

As used herein, the term "heteroaryl group" indicates a monocyclic or bicyclic organic compound including at least one heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring.

In the heteroaryl group, S or N may be present in various oxidized forms.

Non-limiting examples of the monocyclic heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

As used herein, the term "heteroaryl" indicates a heteroaromatic ring fused to at least one of an aryl group, a cycloaliphatic group, and a heterocyclic group.

Non-limiting examples of the bicyclic heteroaryl group are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2] benzazapinyl, benzofuryl, benzothiophenyl, benzotriazolyl, pyrrolo[2,3-b]pyridinyl, pyrrolo[3,2-c]pyridinyl, pyrrolo[3, 2-b]pyridinyl, imidazo[4,5-b]pyridinyl, imidazo[4,5-c] pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c] pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom of the "heteroaryl" group may be substituted with substituents that are the same as those recited above in conjunction with the alkyl group.

As used herein, the term "heteroarylalkyl" group indicates an alkyl group substituted with a heteroaryl group.

As used herein, the term "heteroaryloxy" group indicates a "—O-heteroaryl moiety". At least one hydrogen atom of the heteroaryloxy group may be substituted with substituents that are the same as those recited above in conjunction with the alkyl group.

As used herein, the term "heteroaryloxyalkyl" group indicates an alkyl group substituted with a heteroaryloxy group. At least one hydrogen atom of the heteroaryloxyalkyl group may be substituted with substituents that are the same as those recited above in conjunction with the alkyl group.

As used herein, the term "carbocyclic" group indicates a saturated or partially unsaturated non-aromatic monocyclic, bicyclic or tricyclic hydrocarbon group.

Non-limiting examples of the monocyclic hydrocarbon group are cyclopentyl, cyclopentenyl, cyclohexyl, and cyclohexenyl.

Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, and bicyclo[2.2.2]octyl.

An example of the tricyclic hydrocarbon group is adamantyl.

At least one hydrogen atom of the "carbocyclic group" may be substituted with substituents that are the same as those recited above in conjunction with the alkyl group.

As used herein, the term "heterocyclic group" indicates a five- to ten-membered cyclic group including a heteroatom such as N, S, P, or O. An example of the heterocyclic group is pyridyl. At least one hydrogen atom in the heterocyclic group may be substituted with substituents that are the same as those recited above in conjunction with the alkyl group.

As used herein, the term "heterocyclic oxy" indicates "—O-hetero ring". At least one hydrogen atom of the heterocyclic oxy group may be substituted with substituents that are the same as those recited above in conjunction with the alkyl group.

As used herein, the term "sulfonyl" indicates R"—$SO_2$—, wherein R" is a hydrogen atom, alkyl, aryl, heteroaryl, arylalkyl, heteroarylalkyl, alkoxy, aryloxy, cycloalkyl, or a heterocyclic group.

As used herein, the term "sulfamoyl" group refers to $H_2NS(O_2)$—, alkyl-$NHS(O_2)$—, $(alkyl)_2NS(O_2)$-aryl-NHS $(O_2)$—, alkyl-(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with substituents that are the same as those described above in conjunction with the alkyl group.

As used herein, the term "amino group" indicates a group with a nitrogen atom covalently bonded to at least one carbon or hetero atom. The amino group may refer to, for example, —$NH_2$ and substituted moieties.

As used herein, the term "alkylamino group" also refers to an "alkylamino group" with nitrogen bound to at least one additional alkyl group, or refers to "arylamino" and "diarylamino" groups with at least one or two nitrogen atoms bound to a selected aryl group.

As used herein, the terms "arylalkyl group", "arylalkyloxy group", "heteroarylalkyl group", "heteroarylalkyloxy group", "carbocyclic alkyl group", and "carbocyclic alkyloxy group" refer to groups derived from an aryl group, an aryloxy group, a heteroaryl group, a heteroaryloxy group, a carbocyclic group, and a carbocyclic oxy group, respectively, and further including an alkyl group. These substituents may be substituted with the same substituents as those described above in conjunction with the alkyl group.

As used herein, the term "aromatic" includes a cyclic hydrocarbon with alternating carbon and single bonds between carbon atoms.

As used herein, the term "heteroaromatic" includes an aromatic hydrocarbon wherein at least one of the carbon atoms is replaced with a heteroatom.

The inventive concept will now be described in greater detail with reference to the following examples. These examples are presented for illustrative purposes only and do not limit the scope of the inventive concept.

Comparative Example 1: Preparation of Sulfonated Polyarylene Ether Sulfone (PAES50) and Electrolyte Membrane Including the Same fone ("DCDPS"), and 13.45 mmol (0.5 equiv.) of bis(4-chloro-3-sulfophenyl)sulfone disodium salt ("SDCDPS") were added into a three-neck round-bottomed flask equipped with a Dean-Stark trap in a nitrogen atmosphere, 30.94 mmol (1.15 equiv.) of potassium carbonate, 60.35 mL of NMP, and 30.17 mL of toluene were added thereto, mixed, and thermally treated at about 150° C. for about 4 hours for dehydration reaction. The temperature of the reaction mixture was slowly increased to 190° C., and the reaction mixture was maintained at that temperature for about 40 hours for polymerization reaction. The reaction mixture was changed into a viscous solution through the polymerization reaction.

After completion of the polymerization reaction, the temperature of the reaction mixture was lowered to room temperature, and distilled water was added thereto to obtain a precipitate.

The precipitate was washed several times with water, followed by Soxhlet extraction using deionized water to remove a residue salt or solvent. The resulting product was dried in a 60° C.-vacuum oven to obtain a sulfonated polyarylene ether sulfone ("PAES50") disodium salt.

1 g of the sulfonated PAES50 disodium salt was dissolved in 5.67 g of N,N-dimethylacetamide ("DMAC"). The resulting solution was cast on a glass substrate using a bar coater and heated while increasing the temperature stepwise from room temperature to about 80° C. to evaporate DMAC. The temperature of the resulting product was slowly decreased, and the product was immersed in water to separate a film from the glass plate. The film separated from the glass plate

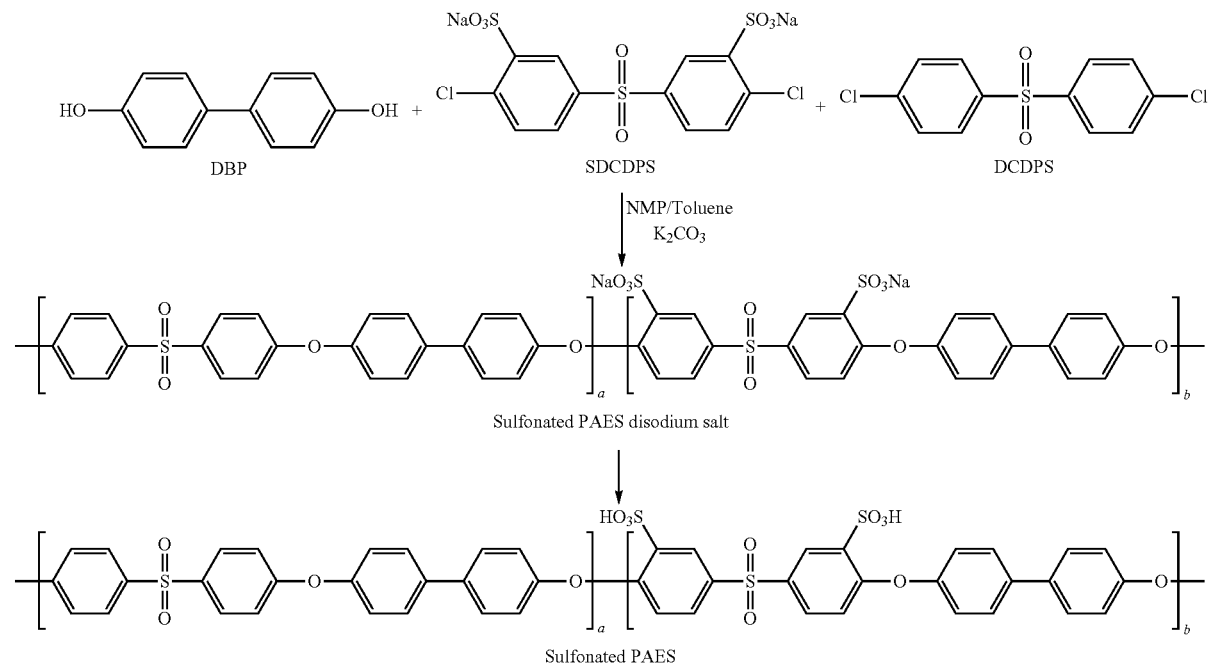

Reaction Scheme 1

In Reaction Scheme 1, a was 0.5, b was 0.5, and the sulfonated polyarylene ether sulfone ("sulfonated PAES") had a weight average molecular weight of about 350,000 Da.

After 26.9 mmol (1 equiv.) of 4,4'-dihydroxybiphenyl ("DBP"), 13.45 mmol (0.5 equiv.) of dichlorodiphenyl sulwas immersed in a 3 percent by weight ("wt %") hydrogen peroxide solution for about 1 hour to remove a low-molecular weight material adhering to a surface of the film, and then immersed in a 1 molar ("M") aqueous sulfuric acid solution at about 80° C. for about 6 hours for protonation reaction to convert —SO₃Na of the sulfonated SAES50 into —SO₃H. The resulting product was immersed in distilled water for about 12 hours to remove a sulfuric acid residue from the film, thereby obtaining a sulfonated SAES50 electrolyte membrane.

Comparative Example 2: Preparation of Sulfonated Polyarylene Ether Sulfone ("PAES70") and Electrolyte Membrane Including the Same A sulfonated PAES70 disodium salt and an electrolyte membrane including the same were prepared in the same manner as in Comparative Example 1, except that 8.07 mmol (0.3 equiv.) of dichlorodiphenylsulfone ("DCDPS") and 18.83 mmol (0.7 equiv.) of bis(4-chloro-3-sulfophenyl)sulfo disodium salt ("SDCDPS"), instead of 13.45 mmol (0.5 equiv.) of dichlorodiphenylsulfone ("DCDPS") and 13.45 mmol (0.5 equiv.) of bis(4-chloro-3-sulfophenyl)sulfo disodium salt ("SDCDPS"), were used.

A degree of sulfonation of the sulfonated PAES70 was measured, and was found to be about 70%.

Example 1: Preparation of Sulfonated PAES50-SDT and Electrolyte Membrane Including the Same reacted at about 50° C. for about 160 hours for chloromethylation reaction to obtain a chloromethylated polymer PAES50 disodium salt.

0.5 g of the chloromethylated polymer PAES50 disodium salt, 0.1 g of the SDT, and 0.1 g of triethylamine ("TEA") were mixed and dissolved in 2.27 g of DMAC at room temperature to obtain a mixture, which was then cast on a glass substrate using a bar coater. After increasing the temperature from room temperature to about 120° C., the resulting product was thermally treated at about 120° C. for about 5 hours to obtain a sulfonated PAES50-SDT disodium salt film.

The temperature of the resulting product was slowly decreased, and was immersed in water to separate the sulfonated PAES50-SDT disodium salt film from the glass substrate. The sulfonated PAES50-SDT disodium salt film separated from the glass substrate was immersed in a 3 wt % hydrogen peroxide solution for about 1 hour to remove a low-molecular weight material adhering to a surface of the sulfonated PAES50-SDT disodium salt film, and then immersed in a 1 M aqueous sulfuric acid solution at about 80° C. for about 6 hours for protonation reaction to convert —SO₃Na of the polymer into —SO₃H. The resulting product was immersed in distilled water for about 12 hours to remove a sulfuric acid residue from the film, thereby obtaining a sulfonated SAES50-SDT electrolyte membrane.

Reaction Scheme 2

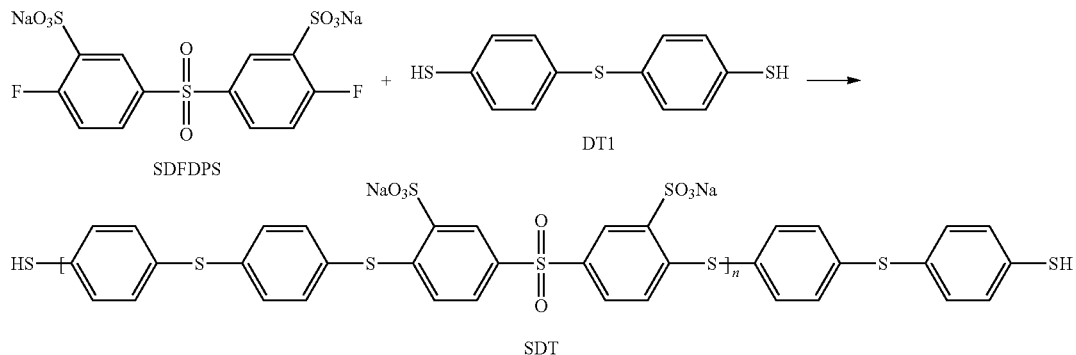

According to Reaction Scheme 2 above, 27 mL of sulfolane and 1.15 mmol of potassium carbonate were added to 5 mmol (1 equiv.) of bis(4-fluoro-3-sulfophenyl)sulfone disodium salt ("SDFDPS") and 6 mmol (1 equiv.) of Compound DT1 having a thiol group, and stirred at about 100° C. for about 4 hours for dehydration reaction. The temperature of the reaction mixture was slowly increased to about 180° C., and the reaction mixture was maintained at that temperature for about 24 hours for polymerization reaction.

The reaction mixture was changed into a viscous solution through the polymerization reaction. After completion of the polymerization reaction, the temperature of the reaction mixture was cooled down to room temperature, and isopropyl alcohol was added thereto to obtain a precipitate.

The precipitate was washed several times with water, followed by Soxhlet extraction using isopropyl alcohol to remove a residue salt or solvent. The resulting product was dried in a 60° C.-vacuum oven to obtain SDT (n=about 50).

Separately, 1.53 g of tin chloride (SnCl₄) and 2.26 g of CH₃OCH₂Cl were added to 3 g of the sulfonated PAES50 disodium salt prepared in Comparative Example 1 and Example 2: Preparation of Sulfonated PAES70-SDT and Electrolyte Membrane Including the Same A sulfonated PAES70-SDT disodium salt and a sulfonated PAES70-SDT electrolyte membrane were prepared in the same manner as in Example 1, except that 0.5 g of the sulfonated PAES70 disodium salt prepared in Comparative Example 2, instead of 0.5 g of the sulfonated PAES disodium salt prepared in Comparative Example 1, was used.

Example 3: Preparation of Sulfonated PAES50-STDT and Electrolyte Membrane Including the Same A sulfonated PAES50-TPDT and an electrolyte membrane including the same were prepared in the same manner as in Example 1, except that 0.19 g of STDT (where M is Na) represented by Formula 17a below, instead of 0.1 g of SDT, was reacted with 0.5 g of the chloromethylated polymer sulfonated PAES disodium salt.

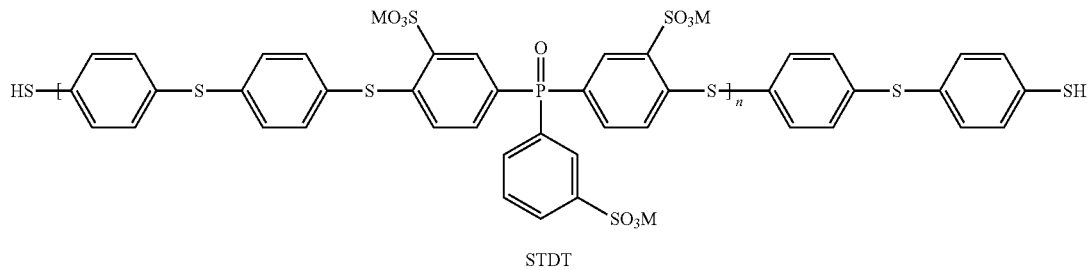

Formula 17a

STDT

In Formula 17a, n was about 50, and M was Na.

The STDT of Formula 17a above was prepared as follows.

5 mmol of SDFTPPO and 5 mmol of Compound DT1 were added to 32 mL of sulfolane and 1.15 mmol of potassium carbonate and stirred at about 100° C. for about 4 hours for dehydration reaction. The temperature of the reaction mixture was slowly increased to about 180° C., and the reaction mixture was maintained at that temperature for about 24 hours for polymerization reaction. The reaction mixture was changed into a viscous solution through the polymerization reaction. After completion of the polymerization reaction, the temperature of the reaction mixture was lowered to room temperature, and isopropyl alcohol was added thereto to obtain a precipitate.

The precipitate was washed several times with water, followed by Soxhlet extraction using isopropyl alcohol to remove a residue salt or solvent. The resulting product was dried in a 60° C.-vacuum oven to obtain STDT of Formula 17a above. The STDT had an n of about 50.

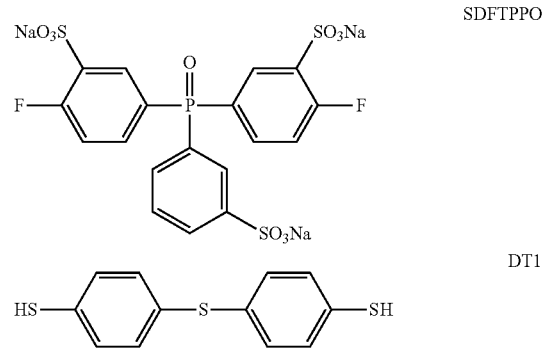

SDFTPPO

DT1

Comparative Example 3: Preparation of Sulfonated PAES50-DT and Electrolyte Membrane Including the Same A sulfonated PAES50-DT disodium salt and a sulfonated PAES50-DT electrolyte membrane were prepared in the same manner as in Example 1, except that Compound DT2, instead of SDT, was used.

The DT2 was prepared as follows.

Reaction Scheme 3

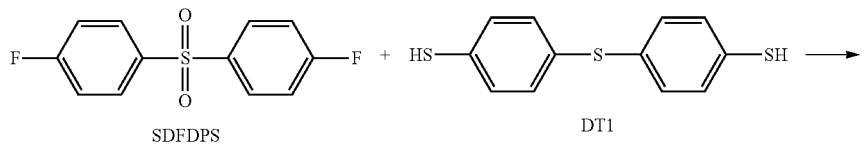

SDFDPS          DT1

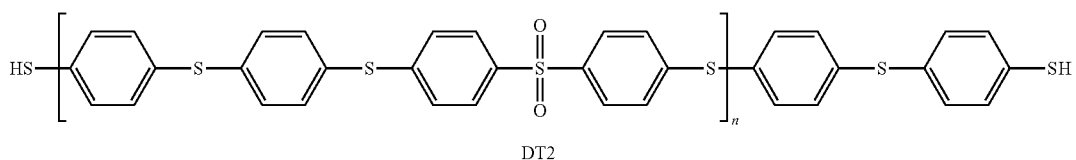

DT2

According to Reaction Scheme 3 above, 5 mmol (1 equiv.) of bis(4-fluoro-3-sulfophenyl)sulfone ("SDFDPS") and 6 mmol (1 equiv.) of sulfonated compound DT1 having a thiol group were added to 19 mL of sulfolane and 1.65 mmol of potassium carbonate and stirred at about 100° C. for about 4 hours for dehydration reaction. The temperature of the reaction mixture was slowly increased to about 180° C. and the reaction mixture was maintained at that temperature for about 24 hours for polymerization reaction. The reaction mixture was changed into a viscous solution through the polymerization reaction. After completion of the polymerization reaction, the temperature of the reaction mixture was lowered to room temperature, and isopropyl alcohol was added thereto to obtain a precipitate.

The precipitate was washed several times with water, followed by Soxhlet extraction using isopropyl alcohol to remove a residue salt or solvent. The resulting product was dried in a 60° C.-vacuum oven to obtain DT2. The DT2 had an n of about 50.

Comparative Example 4: Preparation of Sulfonated PAES70-DT and Electrolyte Membrane Including the Same A sulfonated PAES70-DT disodium salt and a sulfonated PAES70-DT electrolyte membrane were prepared in the same manner as in Example 2, except that DT2, instead of SDT, was used.

Evaluation Example 1: Spectroscopic Data of Polymers

1) Nuclear Magnetic Resonance (NMR) Spectrum

NMR measurements were performed using a Bruker NMR 600-MHz (Avance ω) spectrometer.

NMR spectra of PAES70 prepared in Comparative Example 2 and the chloromethylated PAES70 prepared in Example 2 were measured. The results are shown in FIGS. 4 and 5, respectively.

Figure 4:
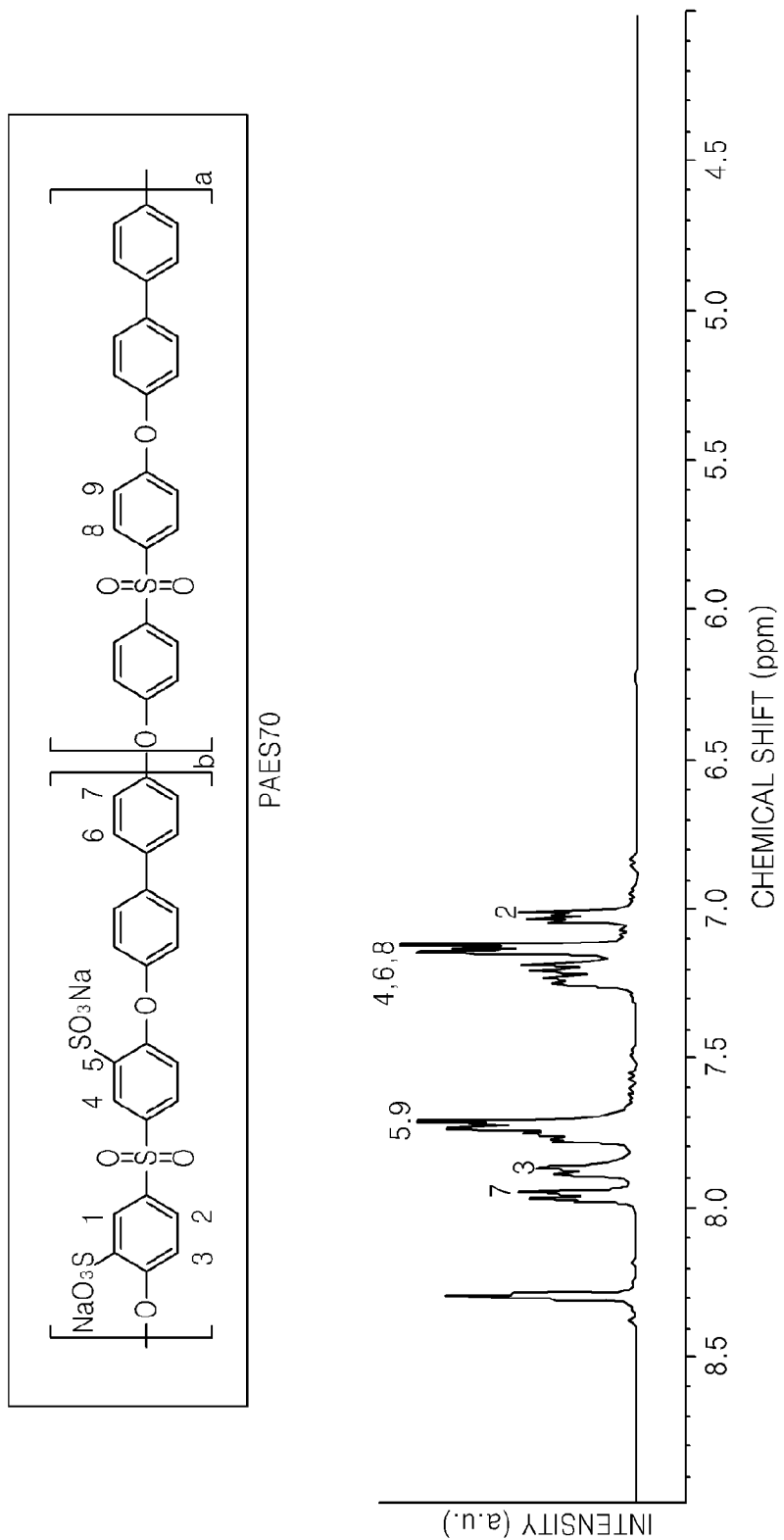
FIG. 4 is a graph of intensity (arbitrary units, a. u.) versus chemical shift (parts per million, ppm), which is a nuclear magnetic resonance ("NMR") spectrum of a sulfonated polyarylene ether sulfone ("PAES70") prepared in Comparative Example 2.
Figure 5:
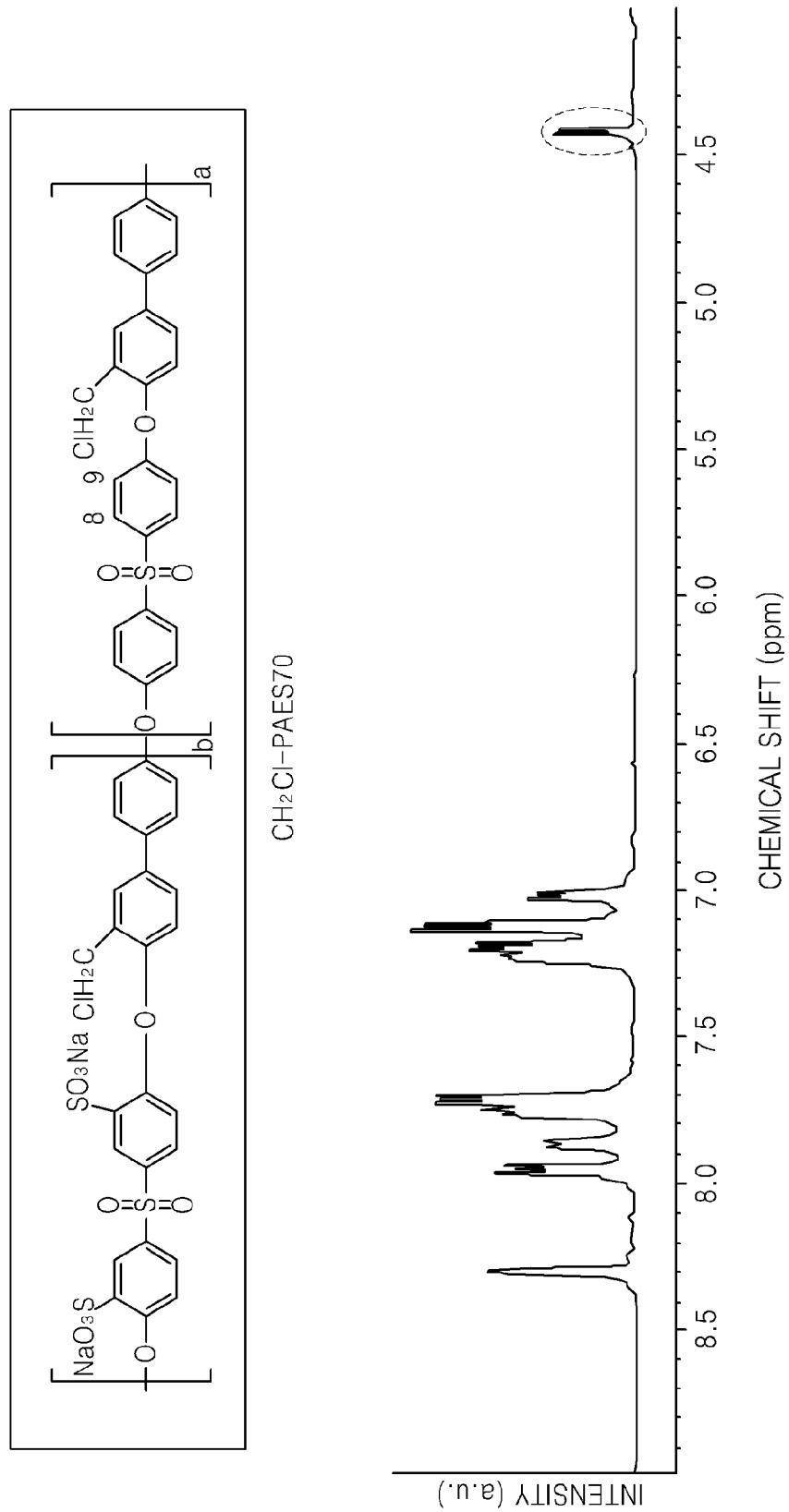
FIG. 5 is a graph of intensity (arbitrary units, a. u.) versus chemical shift (parts per million, ppm), which is an NMR spectrum of a chloromethylated polyarylene ether sulfone ("PAES70") prepared in Example 2.

Referring to FIGS. 4 and 5, it was found that chloromethylation reaction occurred in the sulfonated PAES70 polymer.

Figure 6:
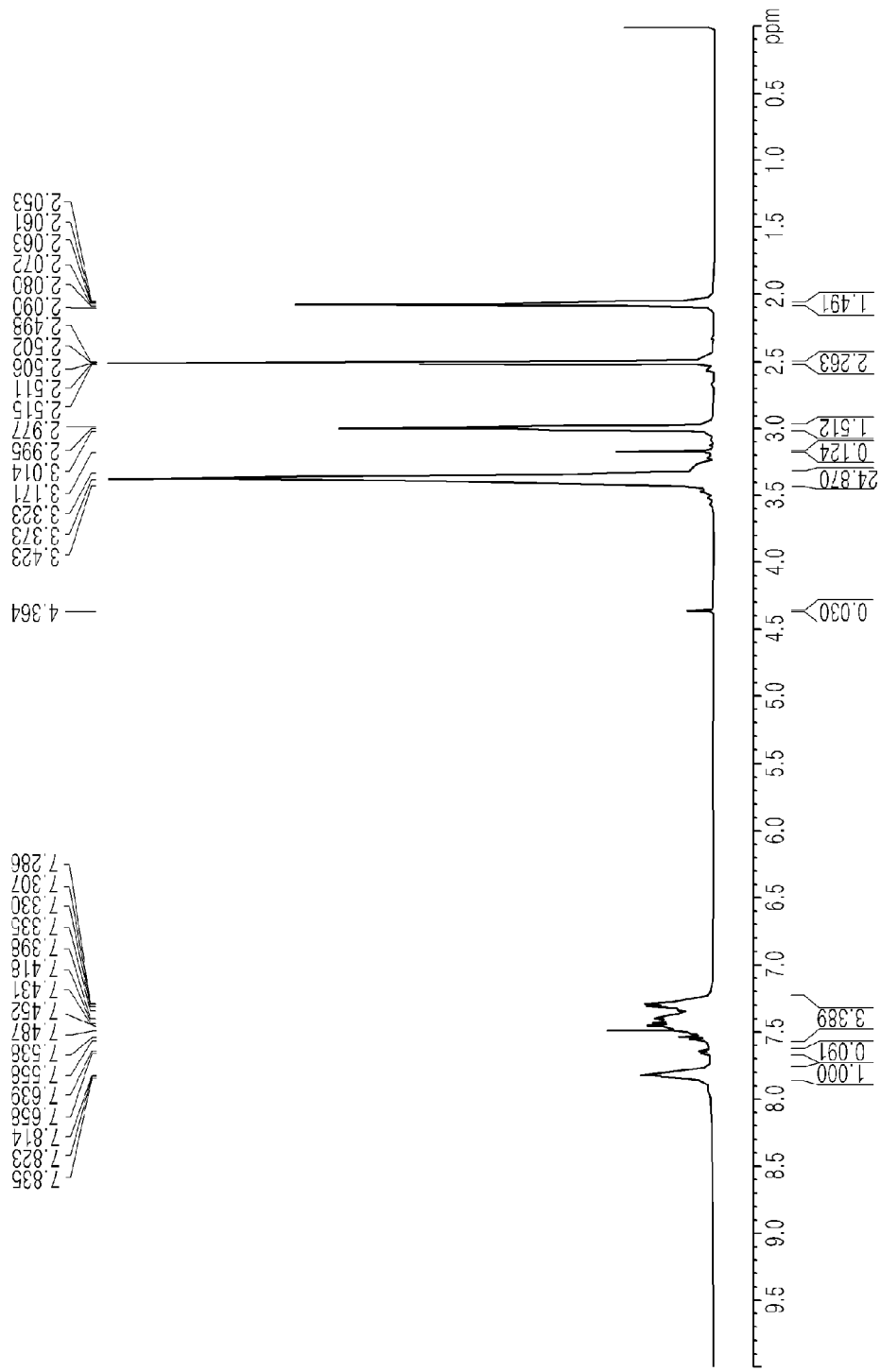
FIG. 6 is a graph of intensity (arbitrary units, a. u.) versus chemical shift (parts per million, ppm), which is an NMR spectrum of DT prepared in Comparative Example 3.
Figure 7:
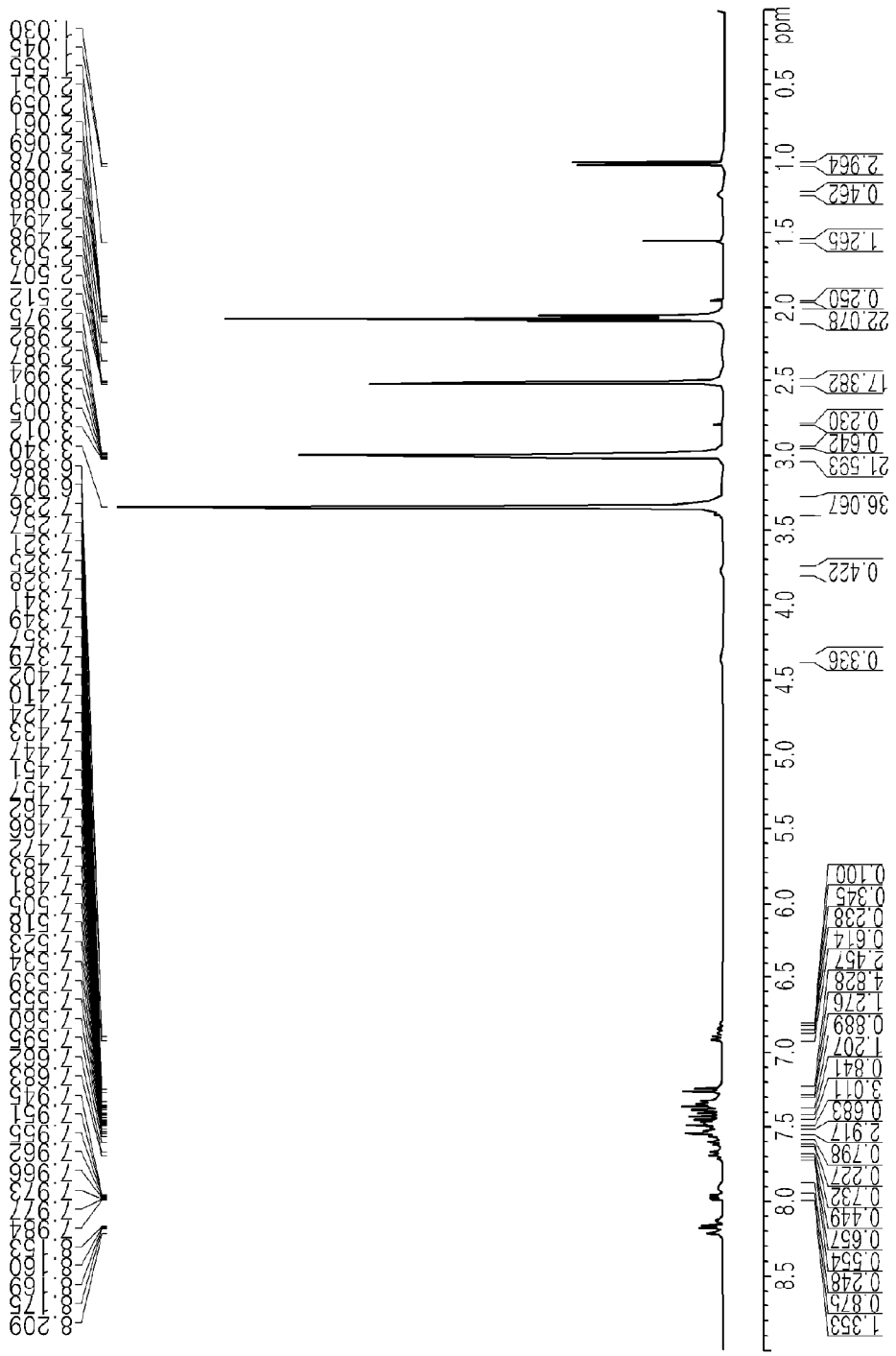
FIGS. 7 and 8 are graphs of intensity (arbitrary units, a. u.) versus chemical shift (parts per million, ppm), which are NMR spectra of SDT and a sulfonated polyarylene ether sulfone ("PAES50-SDT"), respectively, prepared in Example 1.
Figure 8:
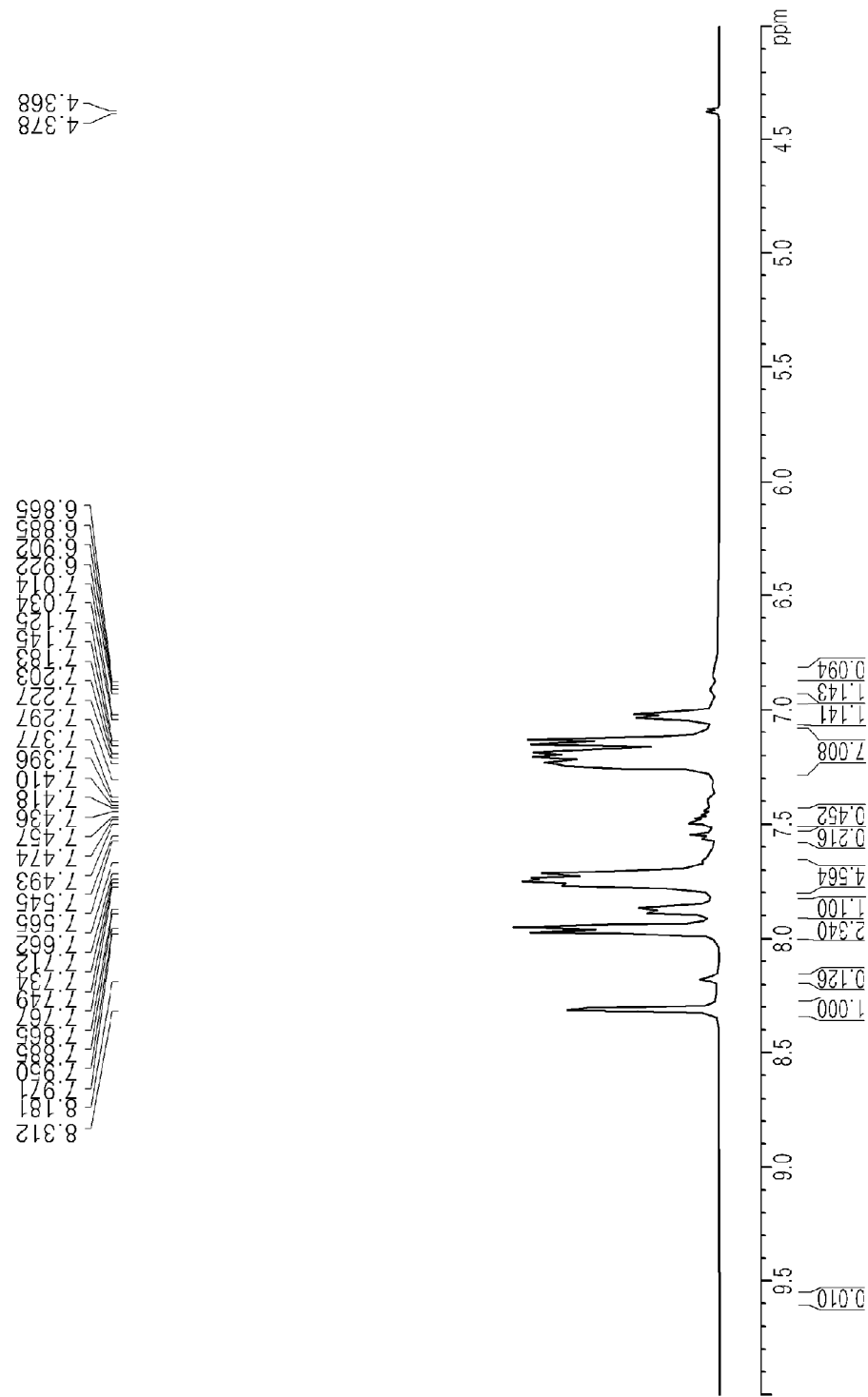

NMR spectra of DT2 prepared in Comparative Example 3, and SDT and the sulfonated PAES50-SDT prepared in Example 1 were measured, and the results thereof are shown in FIGS. 6, 7, and 8, respectively.

2) Fourier-Transform Infrared (FT-IR) Spectrum

FT-IR spectra of the SDT prepared in Example 1 and the DT2 prepared in Comparative Example 3 were measured using attenuated total reflectance in a range of 4000 reverse centimeters ("cm$^{-1}$") to 650 cm$^{-1}$ by using a Nicolet 6700 spectrometer, through 32 times of scanning on average at a resolution of 8 cm$^{-1}$.

Figure 9A:
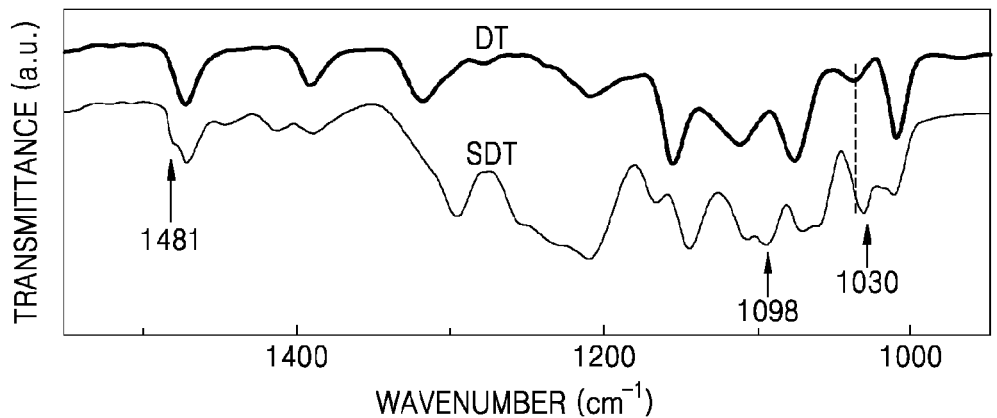
FIG. 9A is a graph of transmittance (arbitrary unit, a. u.) versus wavenumber (reverse centimeters, $cm^{-1}$), which illustrates Fourier-Transform Infrared ("FT-IR") spectra SDT prepared in Example 1 and DT prepared in Comparative Example 3, respectively.

The resulting FT-IR spectra of the SDT of Example 1 and the DT2 of Comparative Example 3 are shown in FIG. 9A.

Referring to FIG. 9A, the DT2 of Comparative Example 3 was found to have a peak at about 1481 cm$^{-1}$, indicating occurrence of tri-substitution in an aromatic ring. The SDT of Example 1 was found to have peaks at about 1030 cm$^{-1}$ and 1097 cm$^{-1}$ resulting from symmetric and asymmetric stretching vibrations of SO$_3$, respectively.

Evaluation Example 2: Measurement of Degree of Sulfonation

Degrees of sulfonation of the sulfonated PAES50 of Comparative Example 1, the sulfonated PAES70 of Comparative Example 2, the PAES50-SDT of Example 1, the polymer PAES70-SDT of Example 2, the polymer PAES50-STDT of Example 3, the polymer PAES50-DT of Comparative Example 3, and the polymer PAES70-DT of Comparative Example 4 were measured. The results are shown in Table 1.

The degrees of sulfonation of the polymer were determined based on a mixed ratio of each sulfonated compound used as a starting material (Degree of sulfonation A) and based on $^1$H-NMR integration calculation (Degree of sulfonation B).

TABLE 1

| | Degree of sulfonation | |
|---|---|---|
| Example | A (monomer) | B ($^1$H-NMR) |
| Comparative Example 1 | 50 | 47 |
| Comparative Example 2 | 70 | 66 |
| Comparative Example 3 | 50 | 47 |
| Comparative Example 4 | 70 | 66 |
| Example 1 | 50 | 47 |
| Example 2 | 70 | 66 |
| Example 3 | 50 | 47 |

Evaluation Example 3: Measurement of Polymer's Physical Characteristics

Intrinsic viscosities, weight average molecular weights ("Mw"), number average molecular weights ("Mn"), ion exchange capacity ("IEC") and molecular weight distributions ("Mw/Mn") of the polymer PAES50 prepared in Comparative Example 1, the sulfonated PAES50-DT prepared in Comparative Example 3, and the sulfonated PAES50-SDT prepared in Example 1 were measured using the following methods. The results are shown in Table 2 below.

(1) Intrinsic Viscosity 0.075 g of each polymer was dissolved in 25 mL of dimethylacetamide at about 30° C. to measure an intrinsic viscosity using a viscometer.

(2) Weight Average Molecular Weight, Number Average Molecular Weight, and Molecular Weight Distribution The weight average molecular weight, number average molecular weight, and molecular weight distribution of each polymer were measured by gel permeation chromatography ("GPC") using polystyrene standard sample.

TABLE 2

| Physical characteristics | | Comparative Example 3 | Example 1 | Comparative Example 1 |
|---|---|---|---|---|
| IECw$^a$ (mequiv./g) | | 1.49 | 2.01 | 1.76 |
| IECv$^b$ (mequiv/g) | Dry | 1.64 | 2.14 | 2.06 |
| | Wet | 1.21 | 1.23 | 0.91 |
| $\eta_{inh}$ (dL/g) | | 0.93 | 1.06 | 2.98 |
| Mw (Da) | | — | — | 350,000 |
| Mn (Da) | | — | — | 83,000 |
| Molecular weight distribution | | — | — | 4.2 |

$^a$IECw was determined by acid-base titration.
$^b$IECv was determined based on volumes of dry and/or wet electrolyte membranes
IECv (wet) = IECv (dry)/(1 + 0.01WU), where WU indicates water uptake ratio, wherein
WU by wt % = ($W_{wet} - W_{dry}$)/$W_{dry}$ × 100, and WU by vol. % = (($W_{wet} - W_{dry}$)/$\delta_{wet}$)/($W_{dry}/\delta_{wet}$) × 100.

Evaluation Example 4: Measurement of Electrolyte Membrane's Physical Characteristics Ion exchange capacities ("IEC"), water uptake characteristics, and swelling ratios of the PAES50 electrolyte membrane of Comparative Example 1, the polymer sulfonated PAES50-SDT electrolyte membrane of Example 1, the sulfonated PAES50-DT2 electrolyte membrane of Comparative Example 3, and the sulfonated PAES70-DT2 electrolyte membrane of Comparative Example 4 were measured using the following methods.

(1) Density

Density was measured using a densitometer.

(2) Ion Exchange Capacity

Ion exchange capacity ("IEC") was determined by acid-base titration.

(3) Water Uptake Ratio

The sulfonated PAES50-SDT electrolyte membrane of Example 1, the polymer sulfonated PAES70-SDT electrolyte membrane of Example 2, the sulfonated PAES50 electrolyte membrane of Comparative Example 1, the sulfonated PAES70 electrolyte membrane of Comparative Example 2, the sulfonated PAES50-DT electrolyte membrane of Comparative Example 3, and the sulfonated PAES70-DT electrolyte membrane of Comparative Example 4 were immersed overnight in water at about 30° C., and weighed at time intervals until the weight of each electrolyte membrane reached a constant level.

Water uptake ratio of each of the electrolyte membranes were calculated using Equations 1 and 2 below. The results are shown in Table 3 below.

$$\text{Water uptake ratio (wt \%)}=(W_{wet}-W_{dry})/W_p \times 100 \quad \text{Equation 1}$$

In Equation 1 above, $W_{wet}$ and $W_{dry}$ indicate the weights of the electrolyte membrane in wet and dry conditions, respectively, after and before the electrolyte membrane is immersed in water.

$$\text{Water uptake ratio (vol. \%)}=((W_{wet}-W_{dry})/\delta_{wet})/(W_{dry}/\delta_{wet}) \times 100 \quad \text{Equation 2}$$

In Equation 2 above, $W_{wet}$ and $W_{dry}$ indicate the weights of the electrolyte membrane in wet and dry conditions, respectively, after and before the electrolyte membrane is immersed in water, and $\delta_{wet}$ indicates a density of the electrolyte membrane immersed in water.

(4) Swelling Ratio

After an initial area and an initial thickness of a dry electrolyte membrane were measured, the electrolyte membrane was immersed in water at 30° C. and was periodically weighed until the electrolyte membrane reached a constant weight. Once the weight of the electrolyte membrane reached a constant level, the electrolyte membrane was removed from the water, and an area and a thickness thereof were measured to calculate a swelling ratio.

$$\text{Swelling ratio}=(S_{wet}-S_{dry})/S_{dry} \times 100(\%) \quad \text{Equation 3}$$

In Equation 3 above, $S_{wet}$ and $S_{dry}$ indicate the areas of the electrolyte membrane in dry and wet conditions, respectively.

TABLE 3

| Physical characteristics | | Example 1 (PAES50-SDT) | Comparative Example 1 (PAES50) |
|---|---|---|---|
| IECw[a] (mequiv./g) | | 2.01 | 1.76 |
| IECv[b] (mequiv./g) | Dry | 2.14 | 2.06 |
| | Wet | 1.23 | 0.91 |
| Density (g/cm³) | Dry | 1.06 | 1.17 |
| | Wet | 0.88 | 0.83 |
| Water uptake ratio | wt % | 43.6 | 61.3 |
| | vol. % | 52.9 | 86.3 |
| Swelling ratio (%) | | 74.4 | 127.0 |

[a]IECw was determined by acid-base titration.
[b]IECv was determined based on volumes of dry and/or wet electrolyte membranes
IECv (wet) = IECv (dry)/(1 + 0.01WU), where WU indicates water uptake ratio, wherein WU by wt % = ($W_{wet} - W_{dry}$)/$W_{dry}$ × 100, and WU by vol. % = (($W_{wet} - W_{dry}$)/$\delta_{wet}$)/($W_{dry}/\delta_{wet}$) × 100.

Evaluation Example 5: Electrolyte Membrane's Dimensional Stability Measurement

After measuring areas and thicknesses of the polymer sulfonated PAES70-SDT electrolyte membrane of Example 2 and the polymer sulfonated PAES70 electrolyte membrane of Comparative Example 2, the electrolyte membranes were immersed in water at different temperatures (25, 40, 60, or 80° C.) and periodically weighed until the weight of each electrolyte membrane reached a constant level, followed by removing the electrolyte membrane from the water and measuring an area and thickness thereof to calculate a swelling ratio in area or thickness using Equations 3 below.

$$\text{Swelling ratio}=(S_{wet}-S_{dry})/S_{dry} \times 100(\%) \quad \text{Equation 3}$$

In Equation 3 above, $S_{wet}$ and $S_{dry}$ indicate the areas of an electrolyte membrane in wet and dry conditions, respectively.

Figure 9B:
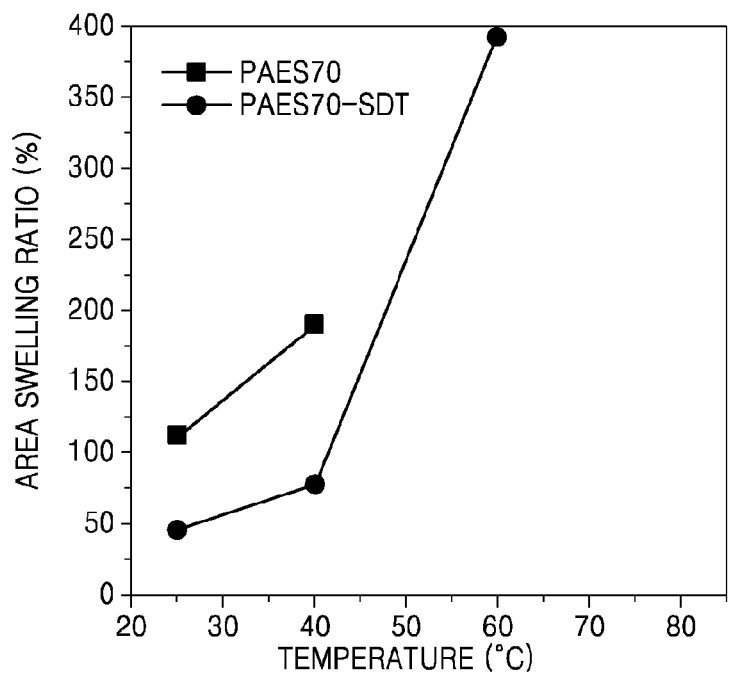
FIG. 9B is a graph of area swelling ratios of a sulfonated PAES70-SDT electrolyte membrane of Example 1 (percent, %) and a sulfonated PAES70 electrolyte membrane of Comparative Example 2 versus temperature (degrees Centigrade, ° C.)
Figure 9C:
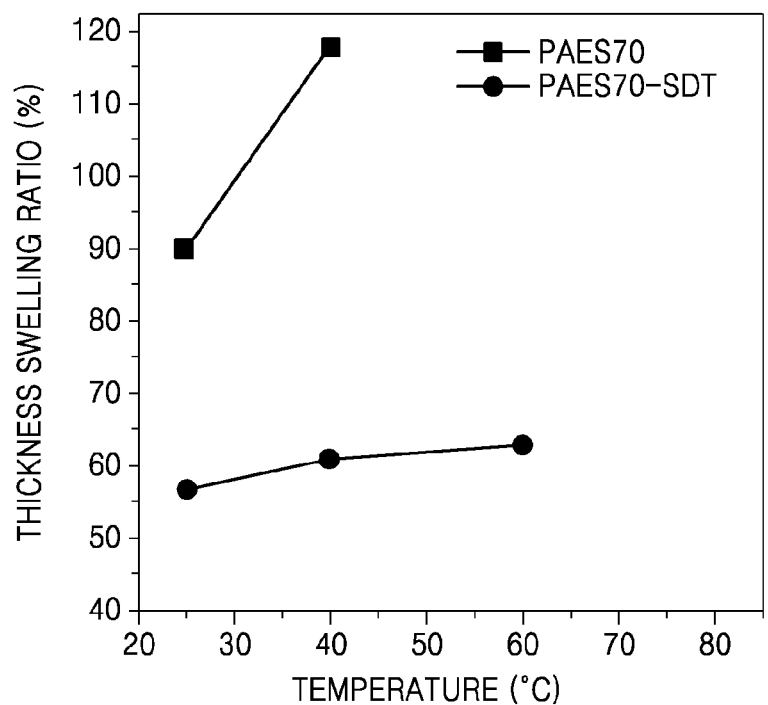
FIG. 9C is a graph of thickness swelling ratios of the sulfonated PAES70-SDT polymer electrolyte membrane of Example 1 and the sulfonated PAES70 polymer electrolyte membrane of Comparative Example 2 (percent, %) versus temperature (degree Centigrade, ° C.)

The results of the calculation are shown in FIGS. 9B and 9C.

Referring to FIGS. 9B and 9C, the sulfonated PAES70-SDT electrolyte membrane of Example 2 was found to mostly have lower swelling ratios than those of the polymer sulfonated PAES70 electrolyte membrane of Comparative Example 2.

Water uptake ratios of the sulfonated PAES70-SDT electrolyte membrane of Example 2, the polymer sulfonated PAES70 electrolyte membrane of Comparative Example 2, and the polymer sulfonated PAES70-DT electrolyte membrane of Comparative Example 4 were measured in the same manner as used to obtain water uptake ratios in Evaluation Example 4. The results are shown in FIG. 9D.

Figure 9D:
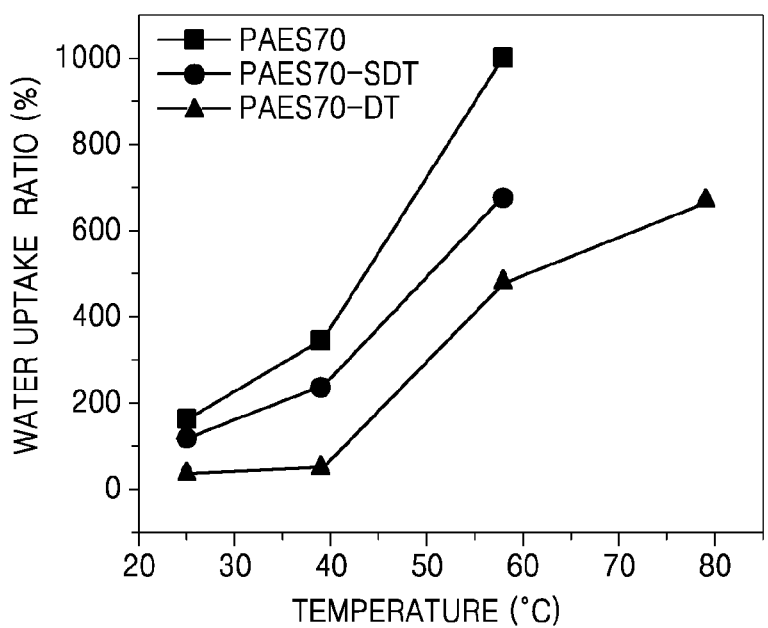
FIG. 9D is a graph of water uptake ratios of the sulfonated PAES70-SDT polymer electrolyte membrane of Example 2, the sulfonated PAES70 polymer electrolyte membrane of Comparative Example 1, and a sulfonated PAES70-DT polymer electrolyte membrane of Comparative Example 4 (percent, %) versus temperature (degree Centigrade, ° C.)

Referring to FIG. 9D, the polymer sulfonated PAES70-SDT electrolyte membrane of Example 2 was found to have stable water uptake ratios than those of the polymer sulfonated PAES70 electrolyte membrane of Comparative Example 2.

Evaluation Example 6: Electrolyte Membrane's Chemical Stability Measurement

The polymer sulfonated PAES70-SDT electrolyte membrane of Example 2, the polymer sulfonated PAES70 electrolyte membrane of Comparative Example 2, and the polymer sulfonated PAES70-DT electrolyte membrane of Comparative Example 4 were immersed in different solvents, i.e., dimethylacetamide ("DMAC"), N-methylpyrrolidone ("NMP"), acetone, or methanol at room temperature (25° C.) for about 2 hours to evaluate state of each electrolyte membrane according to the following criteria:

S: Dissolved in solvent at room temperature
I: Not dissolved in solvent at room temperature
Sw: Swollen in solvent at room temperature The results are shown in Table 4 below.

TABLE 4

| Electrolyte membrane | Solvent | | | |
|---|---|---|---|---|
| | DMAC | NMP | Acetone | Methanol |
| PAES70 | S | S | S | Sw |
| PAES70-SDT | I | I | I | I |
| PAES70-DT | I | I | I | I |

Referring to Table 4, the polymer sulfonated PAES70-SDT electrolyte membrane of Example 2 was found to have improved chemical stability compared to the polymer sulfonated PAES70 electrolyte membrane of Comparative Example 2.

Evaluation Example 7: Electrolyte Membrane's Mechanical Strength Analysis

1) Electrolyte Membranes of Example 1, Comparative Example 1, and Comparative Example 3

Young's modulus values, tensile strength values, and elongations at break values of the sulfonated SPAES50-DT electrolyte membrane of Example 1, the sulfonated PAES50 electrolyte membrane of Comparative Example 1, and the sulfonated PAES50-DT electrolyte membrane of Comparative Example 3 were measured using a universal testing machine (Lloyd LR-10K). Samples for the measurement were prepared according to ASTM standard D638 (Type V specimens).

Tensile strength values of the samples were measured at 26° C., a relative humidity of about 20% to 40%, and a rate of 5 millimeters ("mm") per minute.

Figure 10A:
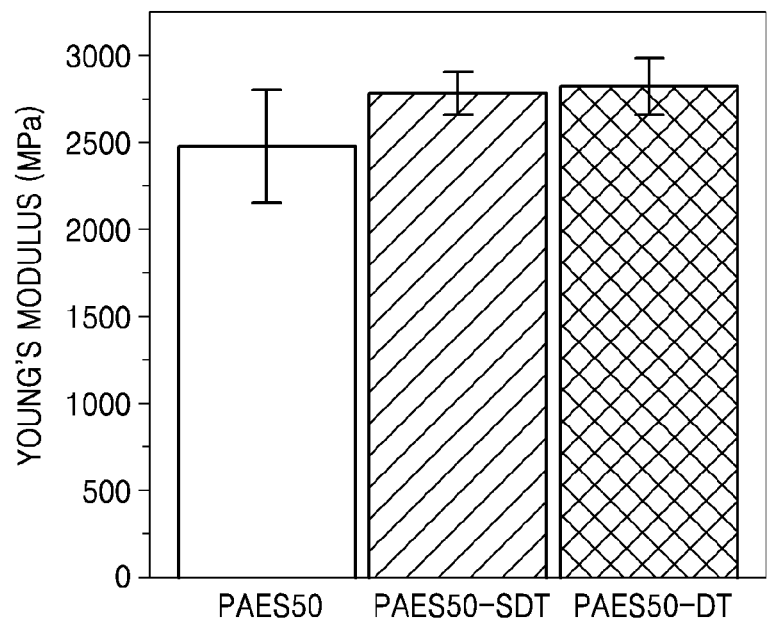
FIG. 10A is a diagram of Young's modulus values of the sulfonated SPAES50-DT-SDT electrolyte membrane of Example 1, the sulfonated PAES50 electrolyte membrane of Comparative Example 1, and a sulfonated PAES50-DT electrolyte membrane of Comparative Example 3 (megapascals, MPa)
Figure 11A:
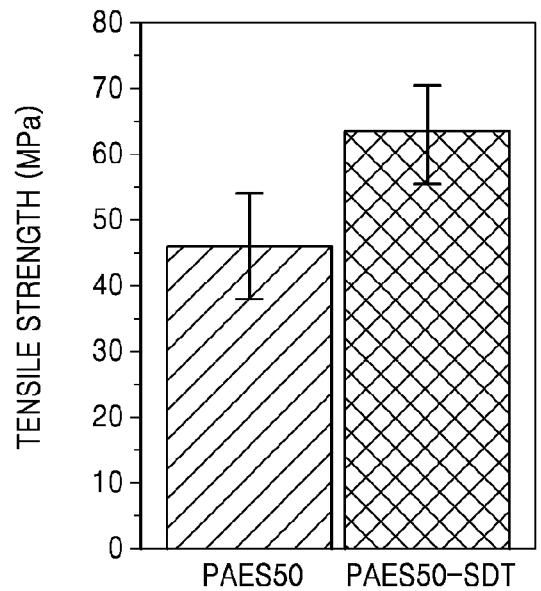
FIG. 11A is a diagram of tensile strength values of the sulfonated PAES50-SDT electrolyte membrane of Example 1 and the sulfonated PAES50 electrolyte membrane of Comparative Example 1 (megapascals, MPa)
Figure 12A:
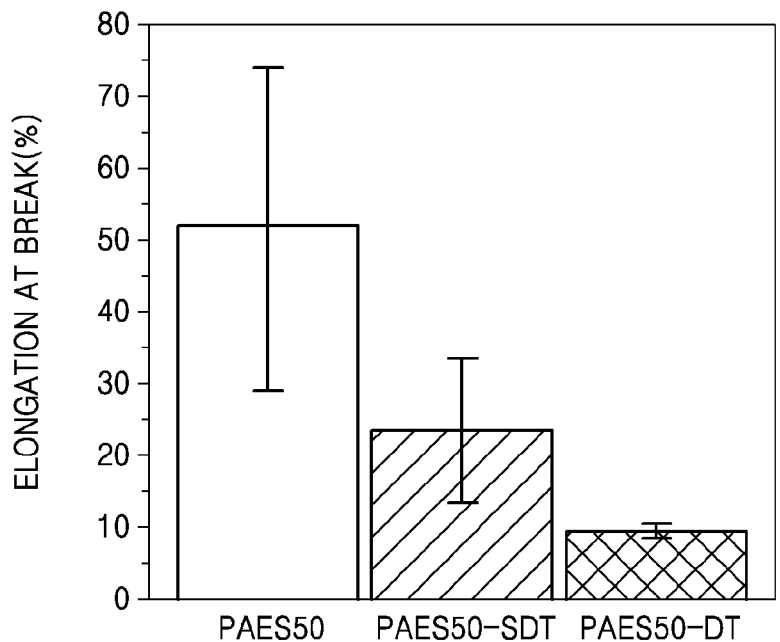
FIG. 12A is a diagram of elongation at break values of the sulfonated SPAES50-DT-SDT electrolyte membrane of Example 1, the sulfonated PAES50 electrolyte membrane of Comparative Example 1, and the sulfonated PAES50-DT electrolyte membrane of Comparative Example 3 (megapascals, MPa)

The results of measuring the Young's modulus values, tensile strength values, and elongations at break values are shown in FIGS. 10A, 11A, and 12A, respectively. In FIGS. 10A, 11A, 12A, PAES50 denotes the electrolyte membrane of Comparative Example 1, PAES50-SDT denotes the electrolyte membrane of Example 1, and PAES50-DT denotes the electrolyte membrane of Comparative Example 3.

Referring to FIGS. 10A, 11A, and 12A, the sulfonated PAES50-SDT electrolyte membrane of Example 1 was found to be greater in tensile strength, Young's modulus, and elongation at break than the sulfonated PAES50 electrolyte membrane of Comparative Example 1.

2) Electrolyte Membranes of Example 2, Comparative Example 2, and Comparative Example 4

Figure 10B:
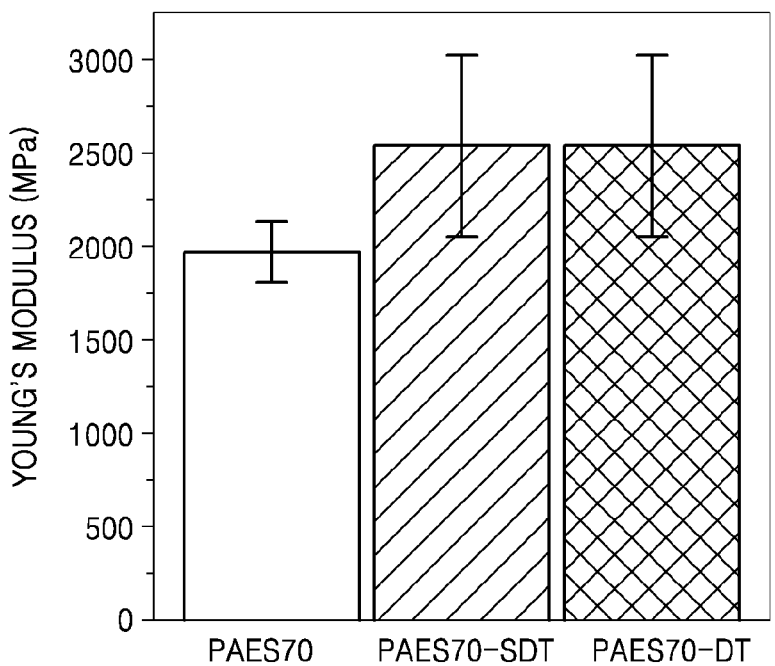
FIG. 10B is a diagram of Young's modulus values of the sulfonated PAES70-SDT electrolyte membrane of Example 2, the sulfonated PAES70 electrolyte membrane of Comparative Example 2, and the sulfonated PAES70-DT electrolyte membrane of Comparative Example 4 (megapascals, MPa)
Figure 11B:
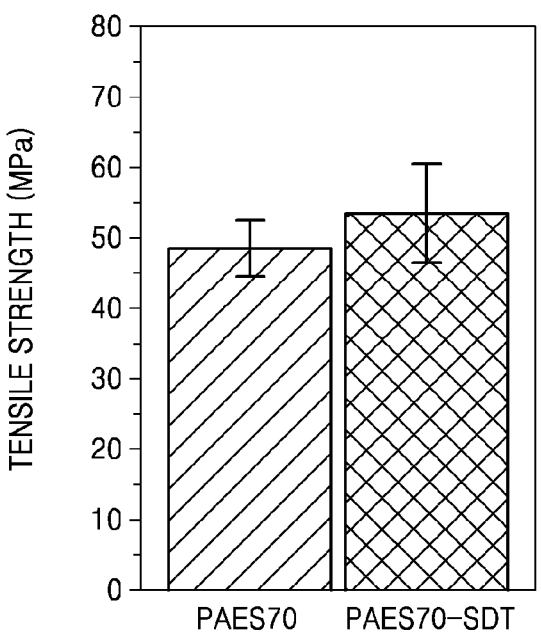
FIG. 11B is a diagram of tensile strength values of the sulfonated PAES70-SDT electrolyte membrane of Example 2 and the sulfonated PAES70 electrolyte membrane of Comparative Example 2 (megapascals, MPa)
Figure 12B:
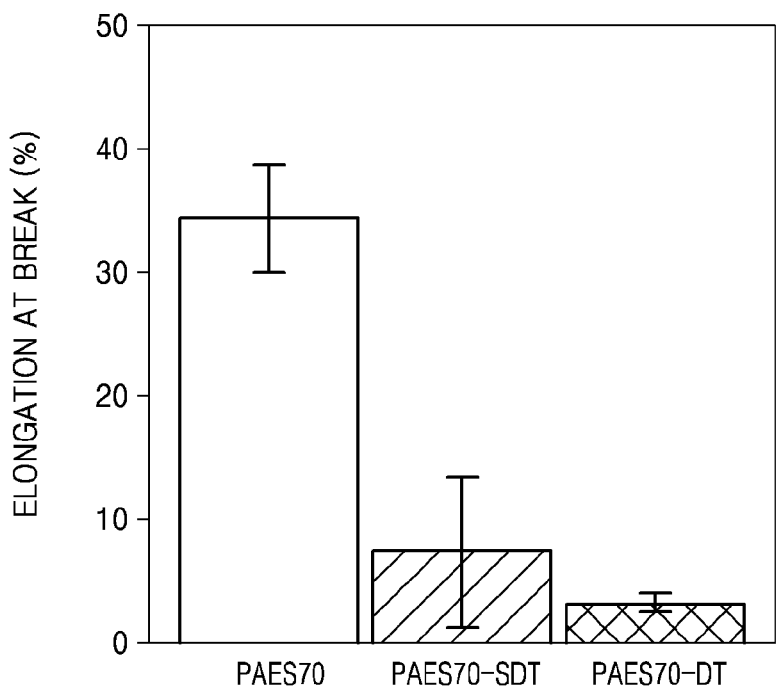
FIG. 12B is a diagram of elongation at break values of the sulfonated PAES70-SDT electrolyte membrane of Example 2, the sulfonated PAES70 electrolyte membrane of Comparative Example 2, and the sulfonated PAES70-DT electrolyte membrane of Comparative Example 4 (megapascals, MPa)

Young's modulus values, tensile strength values, and elongations at break values of the sulfonated PAES70-SDT electrolyte membrane of Example 2, the sulfonated PAES70 electrolyte membrane of Comparative Example 2, and the sulfonated PAES70-DT electrolyte membrane of Comparative Example 4 were measured in the same manner as described above in conjunction with the electrolyte membranes of Example 1, Comparative Example 1, and Comparative Example 3. The results are shown in FIGS. 10B, 11B, and 12B, respectively. In FIGS. 10B, 11B, 12B, PAES70 denotes the electrolyte membrane of Comparative Example 2, PAES70-SDT denotes the electrolyte membrane of Example 2, and PAES70-DT denotes the electrolyte membrane of Comparative Example 4.

Referring to FIGS. 10B, 11B, and 12B, the sulfonated PAES70-SDT electrolyte membrane of Example 2 was found to be greater in tensile strength, Young's modulus, and elongation at break than the sulfonated PAES70 electrolyte membrane of Comparative Example 2.

Evaluation Example 8: Conductivity Measurement

1) Electrolyte Membranes of Example 1, Comparative Example 1, and Comparative Example 3

Changes in conductivity with respect to relative humidity in the electrolyte membranes of Example 1, Comparative Example 1, and Comparative Example 3 were measured. The results are shown in FIG. 3.

The conductivity measurement was performed by a 4-point probe-in plane method using a Bekktec equipment in humidified, hydrogen ($H_2$) (a flow rate of about 10 SCCM) conditions. The electrolyte membranes were loaded in a temperature and humidity adjustable container to measure conductivities at different humidifies at about 120° C.

Figure 13:
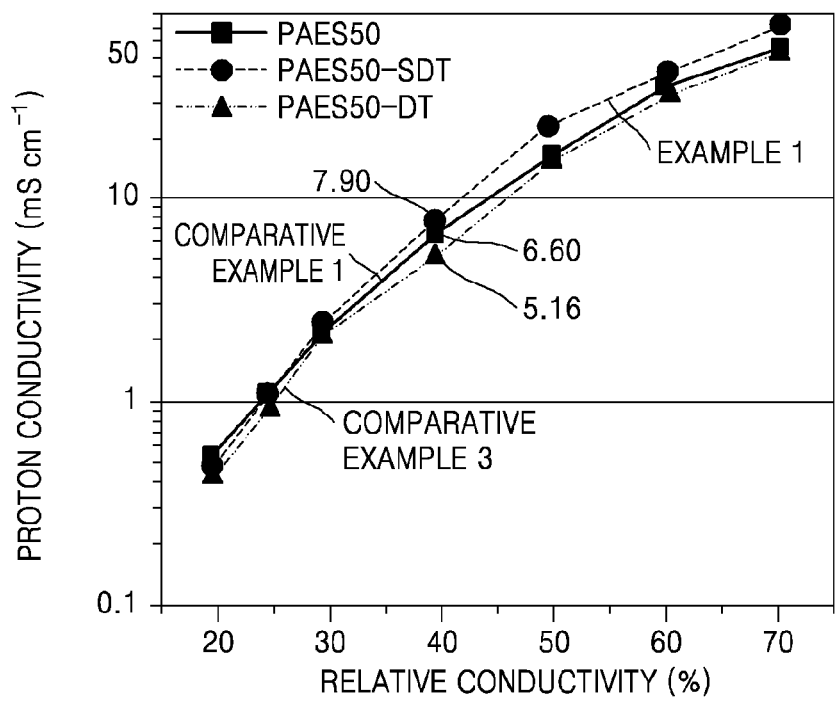
FIG. 13 is a graph of proton conductivity (millisiemens per centimeter) versus relative humidity of the sulfonated SPAES50-SDT electrolyte membrane of Example 1, the sulfonated PAES50 electrolyte membrane of Comparative Example 1, and the sulfonated PAES50-DT electrolyte membrane of Comparative Example 3 (percent, %)

Referring to FIG. 13, the sulfonated PAES50-SDT electrolyte membrane of Example 1 was found to have improved conductivities compared to the sulfonated PAES50 electrolyte membrane of Comparative Example 1 and the sulfonated PAES50-DT electrolyte membrane of Comparative Example 3.

2) Electrolyte Membranes of Example 2 and Comparative Example 4

After the electrolyte membranes of Example 2 and Comparative Example 4 were kept at about 120° C. at a relative humidity of about 19.5% for about 3 hours, changes in conductivity in the electrolyte membranes were measured while the relative humidity was increased to 100%. The results are shown in FIG. 14.

Figure 14:
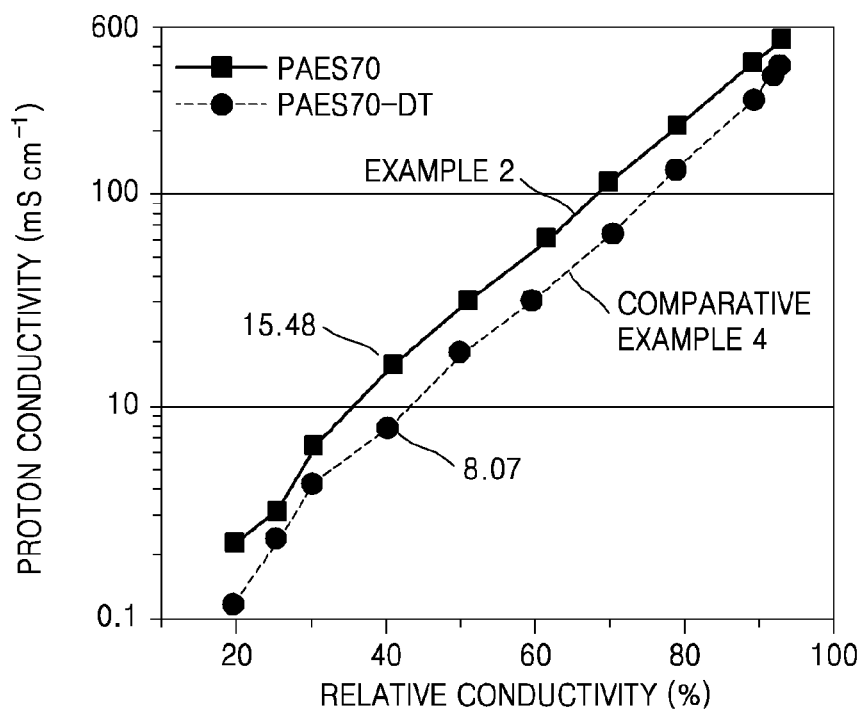
FIG. 14 is a graph of proton conductivity (millisiemens per centimeter) versus relative humidity of the sulfonated PAES70-SDT electrolyte membrane of Example 2 and the sulfonated PAES70-DT electrolyte membrane of Comparative Example 4 (percent, %).

Referring to FIG. 14, the sulfonated PAES70-SDT electrolyte membrane of Example 2 was found to have improved conductivities in low- and high-humidity conditions compared to the sulfonated PAES70-DT electrolyte membrane of Comparative Example 4.

Evaluation Example 9: Cell Durability Evaluation

The electrolyte membrane of Example 1 was disposed between a cathode and an anode to manufacture a fuel cell.

The cathode and the anode were manufactured as follows.

0.5 g of platinum (Pt), 0.25 g of a benzoxazine-based monomer ("4FPh2AP") represented by the following formula, and 5 g of N-methylpyrrolidone ("NMP") were mixed to prepare a cathode catalyst layer forming composition.

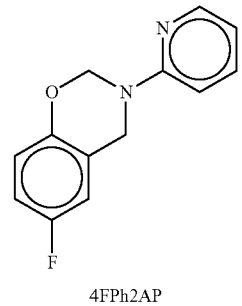

4FPh2AP

The cathode catalyst layer forming composition was coated on an electrode support, and then dried at about 80°

C. for about 1 hour, at about 120° C. for about 20 minutes, and then at about 150° C. for about 10 minutes to form a cathode catalyst layer.

Separately, a catalyst was directly coated on a support and dried at about 80° C. for about 1 hour, at about 120° C. for about 20 minutes, and then at about 150° C. for about 10 minutes to manufacture an anode.

While non-humidified $H_2$ and non-humidified $O_2$ were supplied to the anode and the cathode at about 50 cubic centimeters ("ccm") and about 100 ccm, respectively, the fuel cell was operated at about 100° C. to about 200° C. for performance evaluation.

Durability of the fuel cell was analyzed as follows.

A durability evaluation test was performed on a fuel cell including the electrolyte membrane of Example 1. Cell durability was measured as a change in open circuit voltage ("OCV") through repeated cycles of an accelerated lifetime test ("ALT") mode at a high current density of about 0 to 1 amperes per square centimeter ("A·cm$^{-2}$") for about 1 hour in which an open circuit voltage and a high current density of about 0 to 1 A·cm$^{-2}$ were repeated.

As a result, the fuel cell including the electrolyte membrane of Example 1 was found to have stable cell voltage characteristics even after about 1,500 cycles, indicating improved long-term durability.

As described above, according to the one or more of the above embodiments of the present disclosure, a novel polymer with a higher degree of sulfonation may be prepared from a sulfonated polyarylene ether sulfone. Using this polymer, an electrolyte membrane and an electrode for fuel cells may have improved proton conductivity and improved durability. A high-efficiency fuel cell may be manufactured using the electrolyte membrane and the electrode.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A polymer comprising:
   a reaction product of a sulfonated polyarylene ether sulfone and
   a sulfonated compound comprising a thiol group at a terminal thereof,
   wherein the sulfonated compound comprising a thiol group at a terminal thereof is a compound represented by Formula 1:

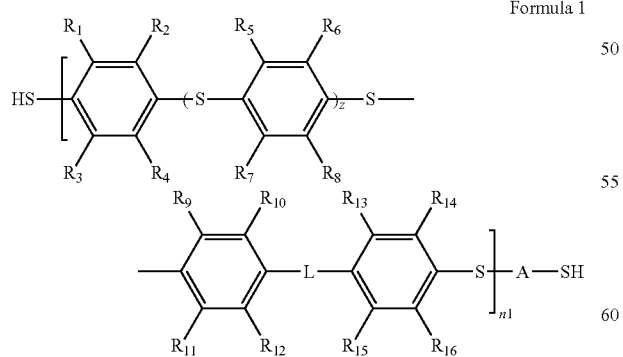

Formula 1 wherein, in Formula 1,
$R_1$ to $R_{16}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, wherein at least one of $R_9$ to $R_{12}$ is —$SO_3M$ group, and at least one of $R_{13}$ to $R_{16}$ is —$SO_3M$ group where M is hydrogen, sodium, or potassium;

z is 0 or 1;

L is —S(=O)$_2$— or —P(=O)Y—, where Y is a C6-C40 aryl group substituted with an —$SO_3M$ group where M is hydrogen, sodium, or potassium, n1 is a number from 1 to 5,000; and A is a group represented by Formula 2:

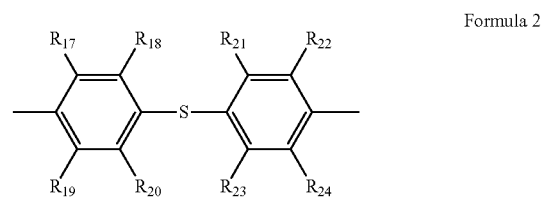

Formula 2 wherein, in Formula 2,
$R_{17}$ to $R_{24}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group.

2. The polymer of claim 1, wherein the sulfonated compound comprising a thiol group at a terminal thereof is at least one of a compound represented by Formula 3 and a compound represented by Formula 4:

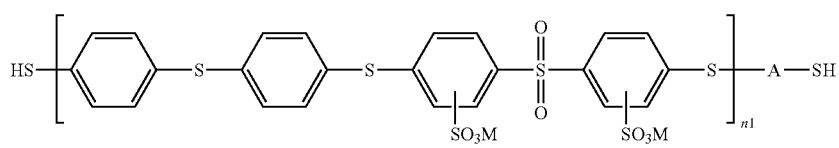

Formula 3 wherein, in Formula 3,
M is hydrogen, sodium, or potassium;
n1 is a number from 1 to 5,000; and
A is a group represented by Formula 2A:

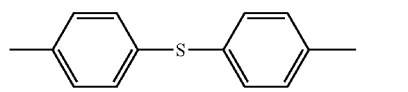

Formula 2A

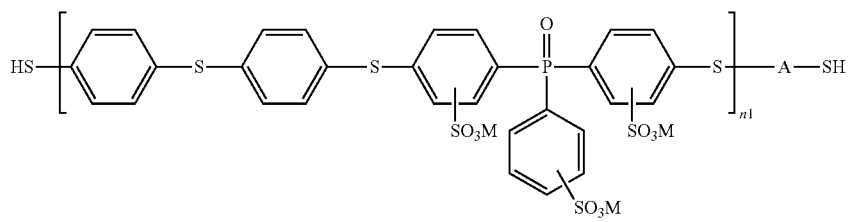

Formula 4 wherein, in Formula 4,
M is hydrogen, sodium, or potassium;
n1 is a number from 1 to 5,000; and
A is a group represented by Formula 2A.

3. The polymer of claim 1, wherein the sulfonated polyarylene ether sulfone comprises
a first repeating unit represented by Formula 5 and
a second repeating unit represented by Formula 6:

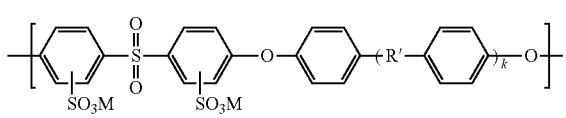

Formula 5 wherein, in Formula 5,
R' is a single bond, —O—, —S(=O)$_2$—, —C(=O)—, or —C(CH$_3$)$_2$—;
M is hydrogen, sodium, or potassium; and
k is 0 or 1,

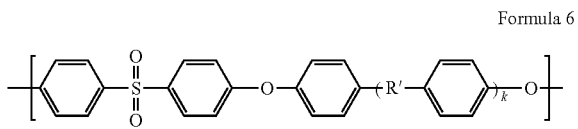

Formula 6 wherein, in Formula 6,
R' is a single bond, —O—, —S(=O)$_2$—, —C(=O)—, or —C(CH$_3$)$_2$—; and
k is 0 or 1.

4. The polymer of claim 3, wherein the first repeating unit represented by Formula 5 is a repeating unit represented by Formula 7:

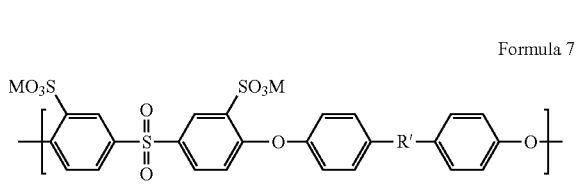

Formula 7 wherein, in Formula 7,
R' is a single bond, —O—, —S(=O)$_2$—, —C(=O)—, or —C(CH$_3$)$_2$—; and
M is hydrogen, sodium, or potassium.

5. The polymer of claim 1, wherein the sulfonated polyarylene ether sulfone comprises a repeating unit represented by Formula 8 and a repeating unit represented by Formula 9, wherein an amount of the repeating unit represented by Formula 8 is from about 0.01 mole % to about 99.99 mole %, and an amount of the repeating unit represented by Formula 9 is from about 0.01 mole % to about 0.99 mole %:

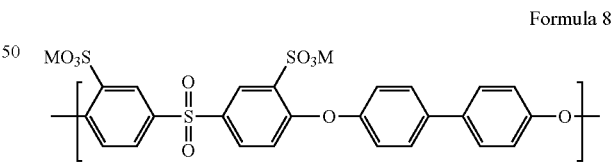

Formula 8 wherein, in Formula 8, M is hydrogen, sodium, or potassium;

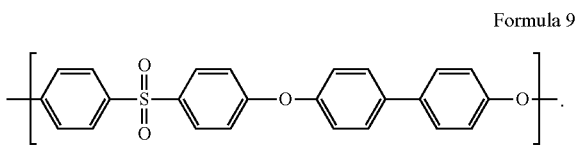

Formula 9

6. The polymer of claim 1, wherein the sulfonated compound comprising a thiol group at a terminal thereof is selected from a compound represented by Formula 10 and a compound represented by Formula 11:

Formula 10

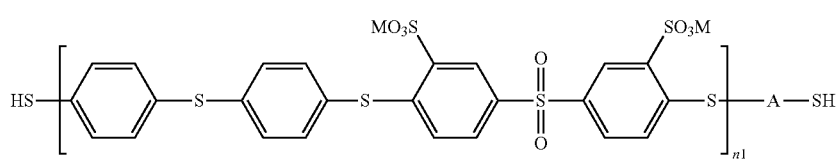

wherein, in Formula 10,
M is hydrogen, sodium, or potassium;
n1 is a number from 1 to 5,000; and
A is a group represented by Formula 2A, Formula 2A

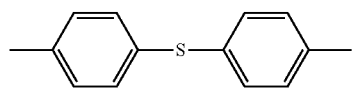

Formula 11

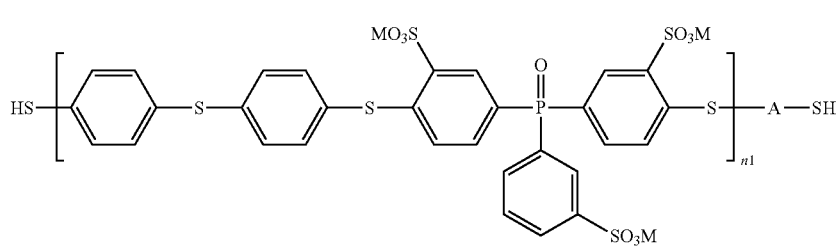

wherein, in Formula 11,
M is hydrogen, sodium, or potassium;
n1 is a number from 1 to 5,000; and
A is a group represented by Formula 2A.

7. The polymer of claim 1, wherein an amount of the sulfonated compound comprising a thiol group at a terminal thereof is from about 1 part to about 99 parts by weight based on 100 parts by weight of the sulfonated polyarylene ether sulfone.

8. The polymer of claim 1, wherein the sulfonated polyarylene ether sulfone has a degree of sulfonation of about 30% to about 95%.

9. The polymer of claim 1, wherein the polymer is a reaction product of a polyarylene ether sulfone represented by Formula 12 or a polyarylene ether sulfone represented by Formula 13, and a compound represented by Formula 14:

Formula 12

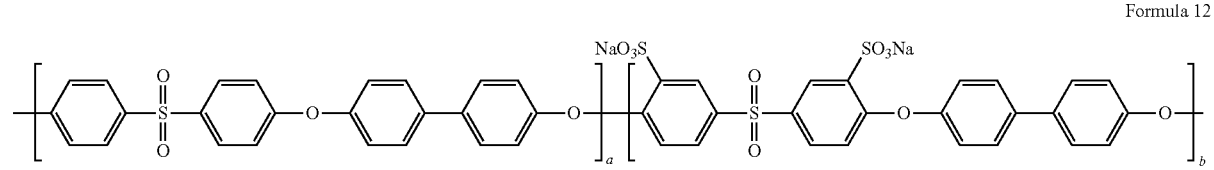

wherein, in Formula 12,
a indicates a mole fraction from about 0.01 to about 0.99, and b indicates a mole fraction from about 0.01 to about 0.99, where a+b=1, Formula 13

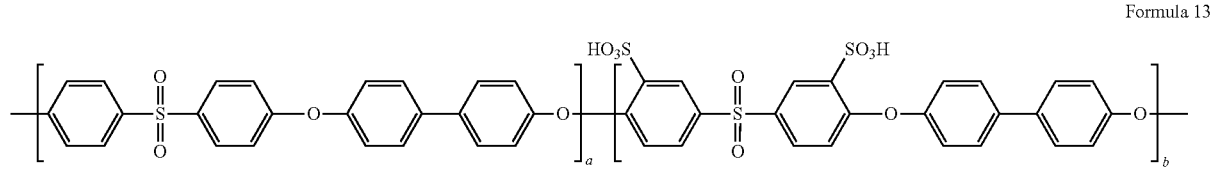

wherein, in Formula 13,
a indicates a mole fraction from about 0.01 to about 0.99, and b indicates a mole fraction from about 0.01 to about 0.99, where a+b=1,

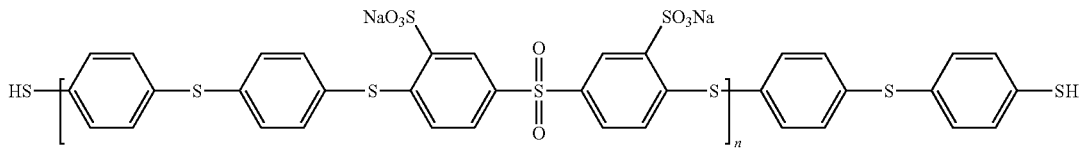

Formula 14 wherein, in Formula 14, n is a number from 1 to 5,000.

10. The polymer of claim 1, wherein the polymer is a reaction product of a polyarylene ether sulfone represented by Formula 12 or a polyarylene ether sulfone represented by Formula 13, and a compound represented by Formula 15:

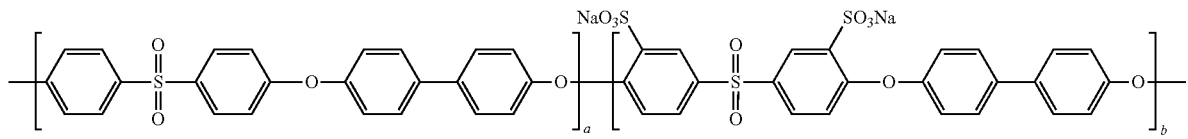

Formula 12 wherein, in Formula 12,
a indicates a mole fraction from about 0.01 to about 0.99, and b indicates a mole fraction from about 0.01 to about 0.99, where a+b=1,

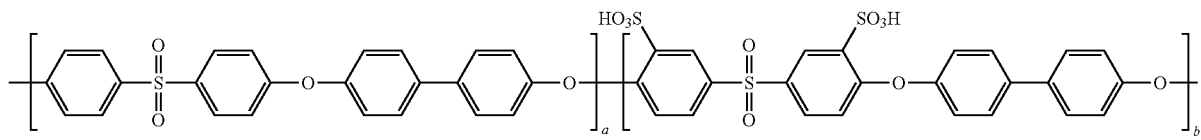

Formula 13 wherein, in Formula 13,
a indicates a mole fraction from about 0.01 to about 0.99, and b indicates a mole fraction from about 0.01 to about 0.99, where a+b=1,

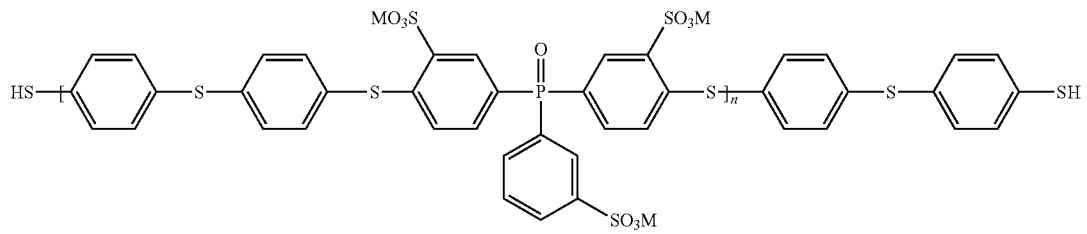

Formula 15 wherein, in Formula 15,
M is hydrogen, sodium, or potassium, and n is a number from 1 to 5,000.

11. The polymer of claim 1, wherein the sulfonated compound comprising a thiol group at a terminal thereof has a degree of polymerization of about 1 to about 5,000.

12. The polymer of claim 1, wherein the sulfonated polyarylene ether sulfone has a degree of polymerization of about 1 to about 5,000, and a weight average molecular weight of about 1,000 Daltons to about 1,000,000 Daltons.

13. An electrolyte membrane for a fuel cell, comprising the polymer of claim 1.

14. An electrode for a fuel cell, comprising the polymer of claim 1.

15. A fuel cell comprising:
a first electrode;
a second electrode; and
an electrolyte membrane disposed between the first electrode and the second electrode,
wherein at least one of the first electrode, the second electrode and the electrolyte membrane comprises the polymer of claim 1.

* * * * *